United States Patent

Sutton et al.

Patent Number: 5,394,601
Date of Patent: Mar. 7, 1995

[54] MULTIPLE WEDGE DETACHABLE CONNECTION AND CLOSURE AND METHOD OF MAKING

[75] Inventors: Samuel J. Sutton, Sedona; Thomas W. Meissner, Phoenix, both of Ariz.

[73] Assignee: Shintech, Inc., Phoenix, Ariz.

[21] Appl. No.: 35,980

[22] Filed: Mar. 23, 1993

Related U.S. Application Data

[63] Continuation-in-part of Ser. No. 752,846, Aug. 30, 1991, Pat. No. 5,201,109, which is a continuation-in-part of Ser. No. 617,506, Nov. 23, 1990, abandoned.

[51] Int. Cl.⁶ .................. B23P 11/02; B21D 39/00
[52] U.S. Cl. .................. 29/451; 29/455.1; 29/525; 29/773; 29/240
[58] Field of Search .......... 29/240, 243.57, 243.58, 29/240.5, 244, 253, 445, 455.1, 525, 773, 451; 215/204, 206, 213, 216, 220–225, 263, 273, 274, 279, 280; 217/79; 220/319

[56] References Cited

U.S. PATENT DOCUMENTS

| | | |
|---|---|---|
| 45,771 | 1/1865 | Tomkins . |
| 404,597 | 6/1889 | Carter . |
| 467,870 | 1/1892 | Campbell . |
| 521,634 | 6/1894 | Carter . |
| 544,823 | 8/1895 | Ney . |
| 579,013 | 3/1897 | Schenker . |
| 700,344 | 5/1902 | Lispenard . |
| 1,216,005 | 2/1917 | Spelling . |
| 1,542,888 | 6/1925 | Iverson . |
| 1,785,076 | 12/1930 | Freshkoff . |
| 1,793,923 | 2/1931 | Fry . |
| 1,877,263 | 9/1932 | Beauchamp . |
| 1,916,827 | 7/1933 | Cremer et al. . |
| 2,160,704 | 5/1939 | Merolle . |
| 3,233,769 | 2/1966 | Jessop . |
| 3,648,872 | 3/1972 | Durso . |
| 3,680,346 | 8/1972 | Wilcox .......... 29/243.58 X |
| 3,743,127 | 7/1973 | Morceau . |
| 3,777,924 | 12/1973 | Kayser et al. . |
| 3,913,769 | 10/1975 | Scrocco et al. . |
| 3,963,139 | 6/1976 | Gach . |
| 4,372,022 | 2/1983 | Puckett .......... 29/243.58 |
| 4,398,334 | 8/1983 | Kovalevich . |
| 4,512,484 | 4/1985 | Mar . |
| 4,787,526 | 11/1988 | Pehr . |
| 4,865,209 | 9/1989 | Bush . |

*Primary Examiner*—Timothy V. Eley
*Attorney, Agent, or Firm*—Cahill, Sutton & Thomas

[57] ABSTRACT

A multiple wedge quick connect and/or disconnect is disclosed in three basic cylindrical embodiments with variations for hand and machine assembly of the connection. One cylindrical part includes a plurality of radially extending pins. Another cylindrical part includes at least one radially extending bearing surface. The two cylindrical parts are coaxially aligned by slidably engaging the pins in corresponding slots formed in the walls of the second cylindrical part. A plurality of wedges are then moved between the pins and bearing surface(s) to either hold them or force them apart, thereby securing the two cylindrical parts in tight detachable engagement. An optional gasket may be deformed between the two cylindrical parts to provide an enhanced seal when they are connected. The connection is broken by removal of the wedges from between the pins and bearing surface(s).

72 Claims, 9 Drawing Sheets

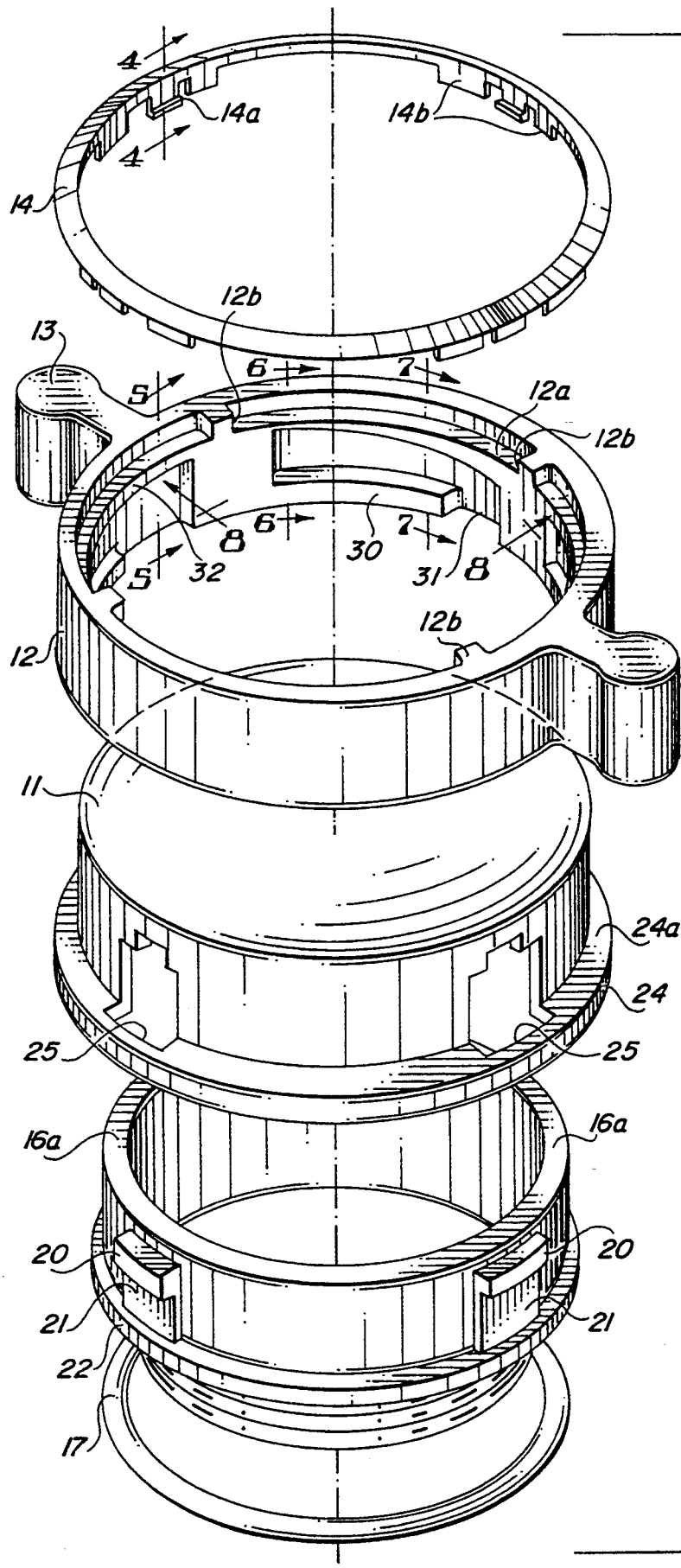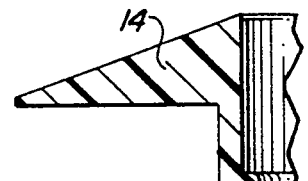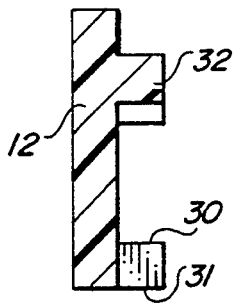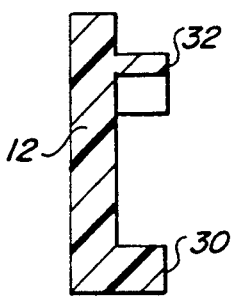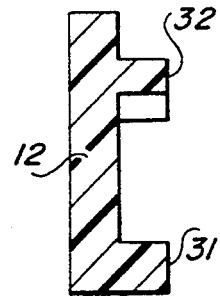

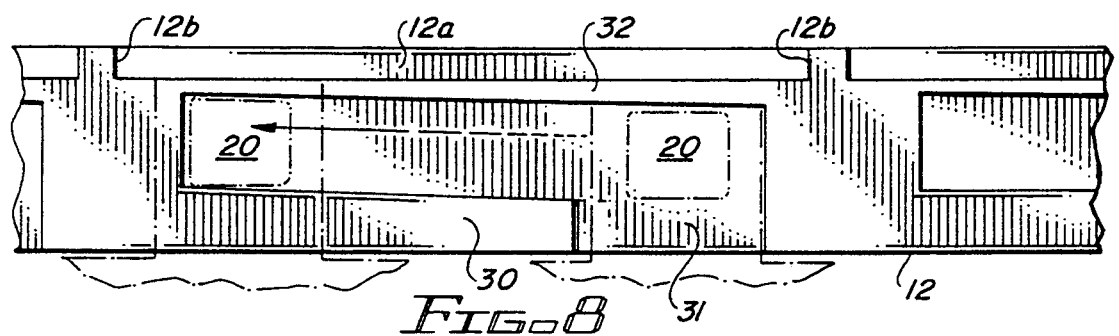
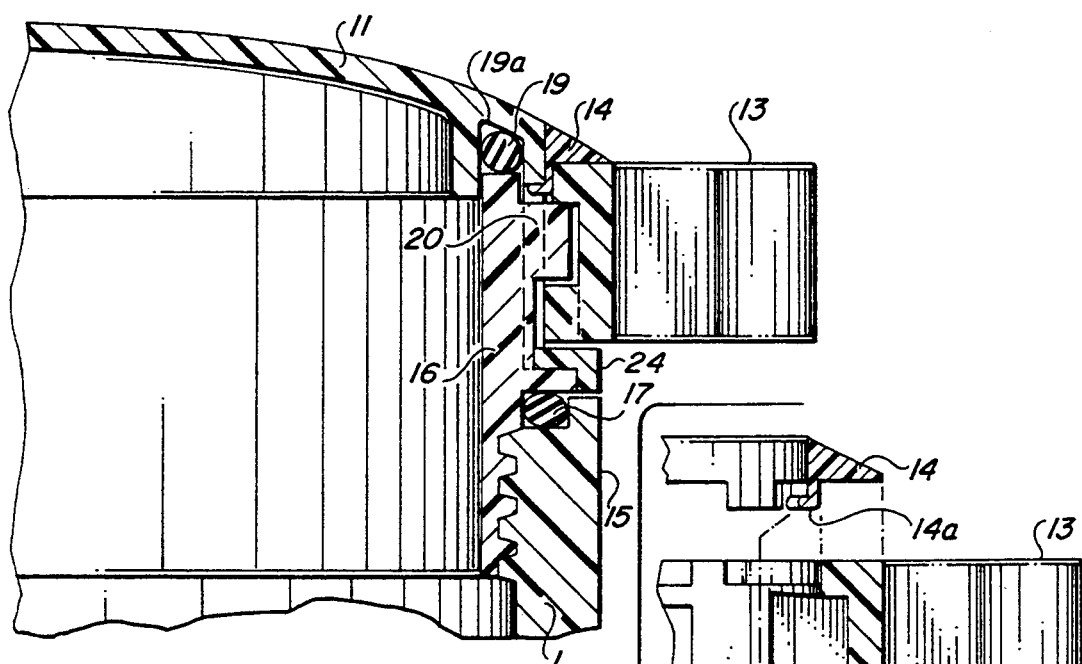
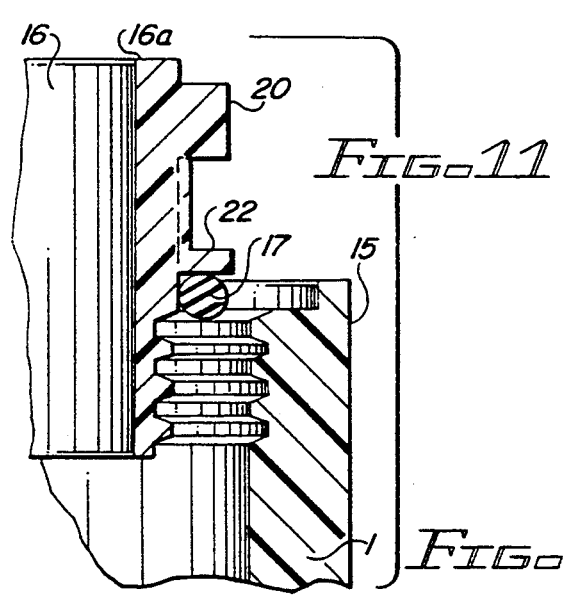

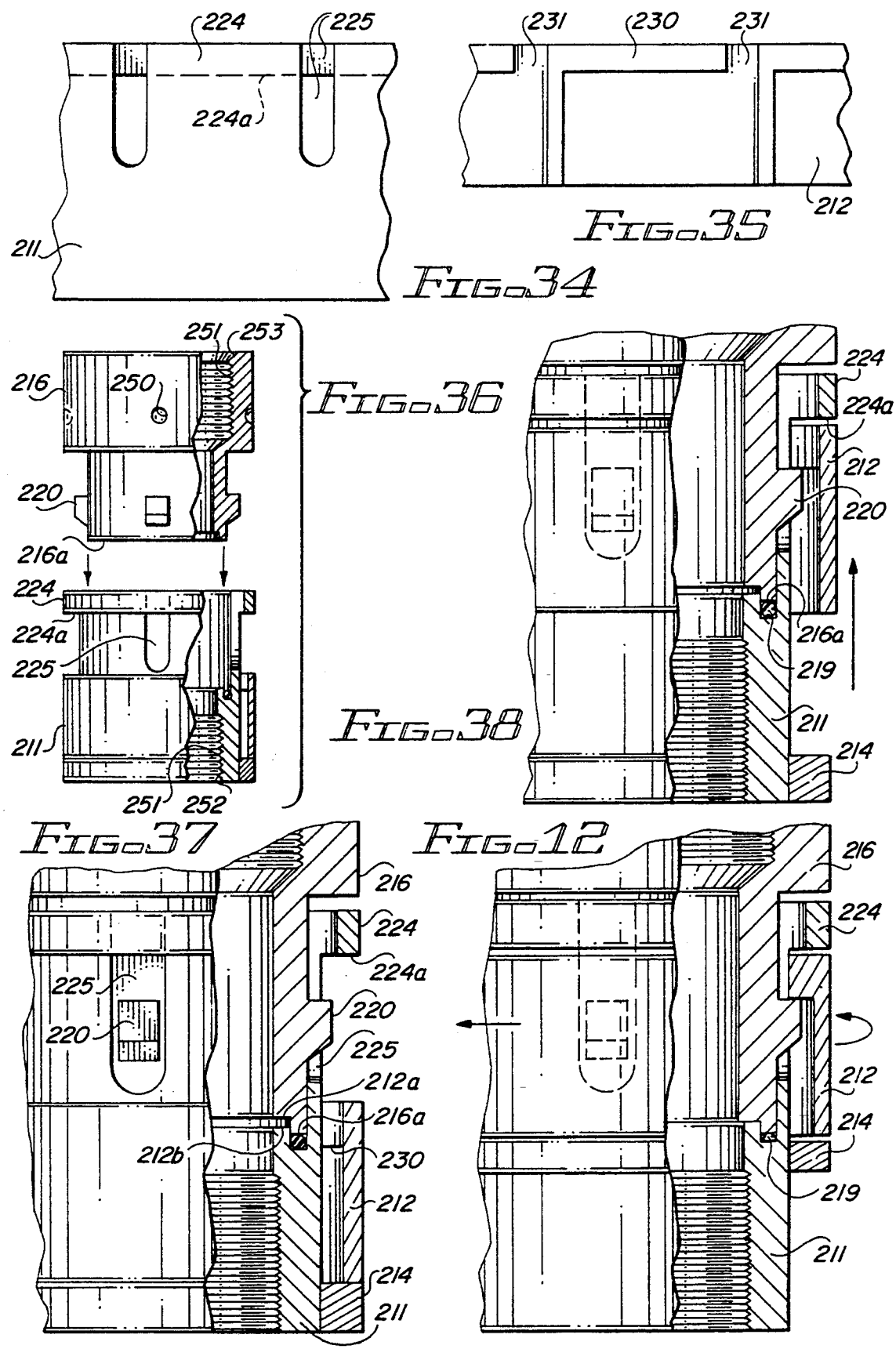

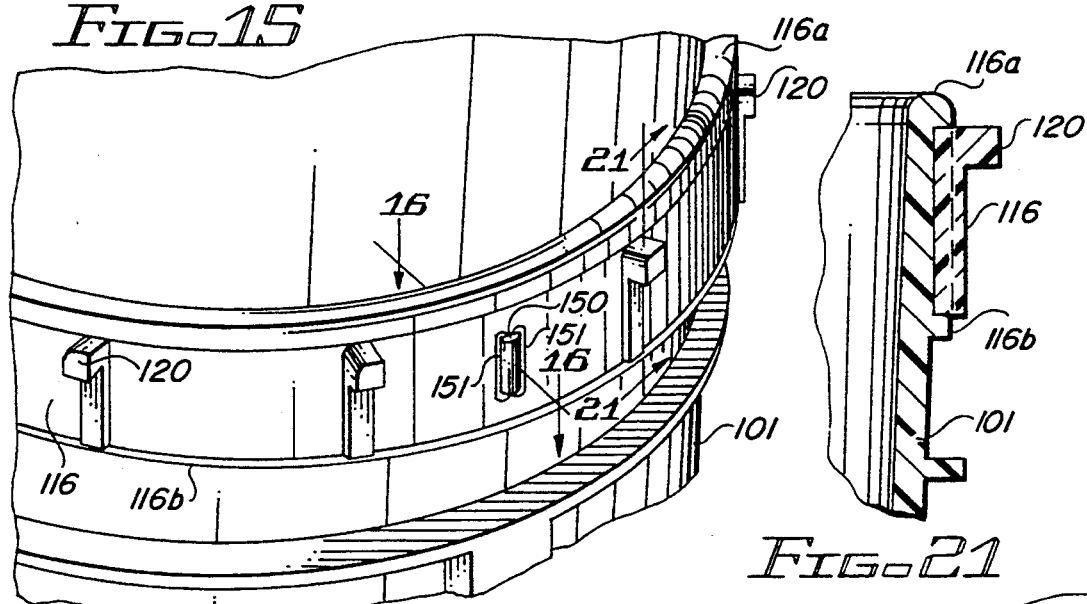
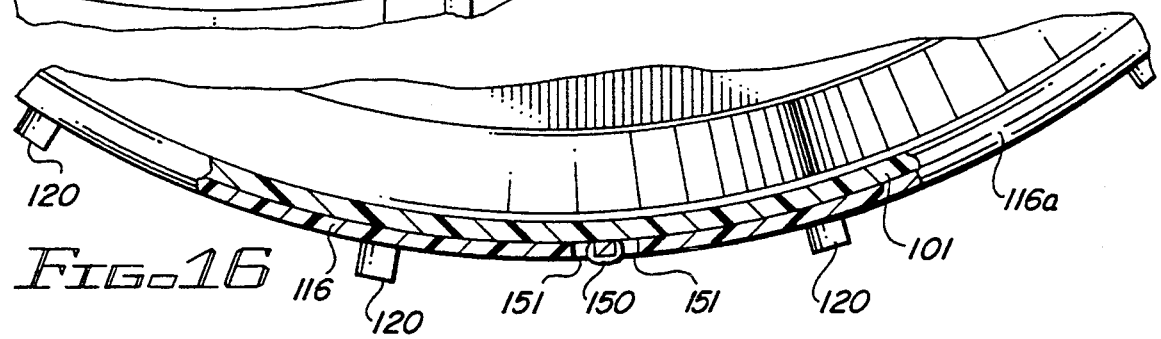
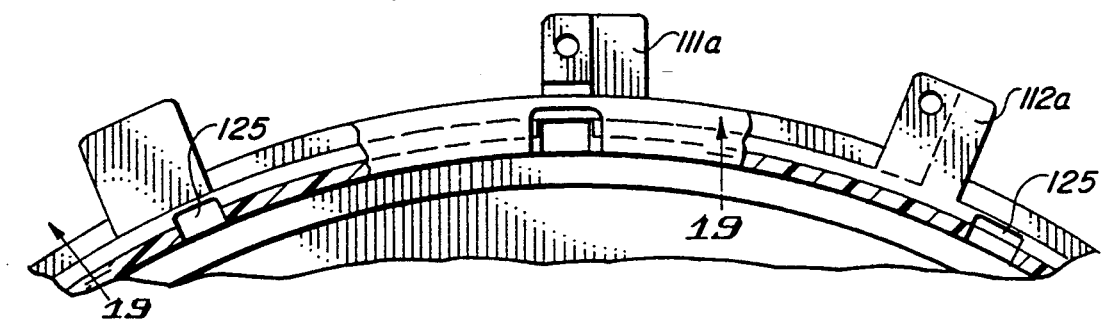
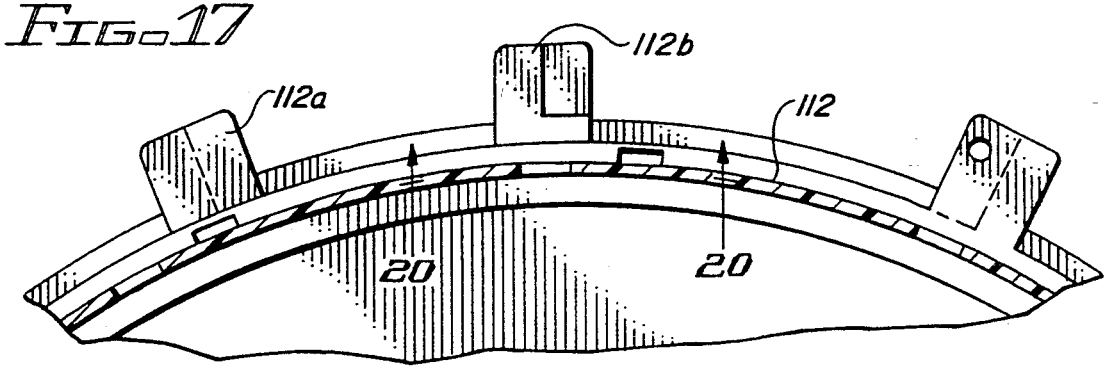

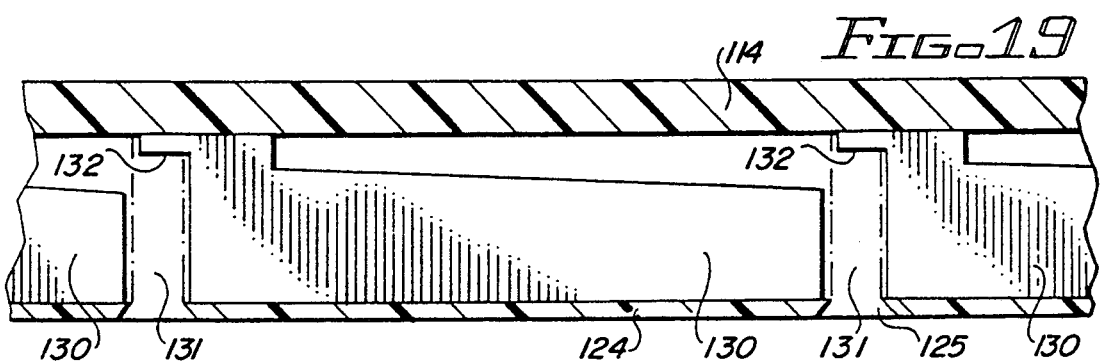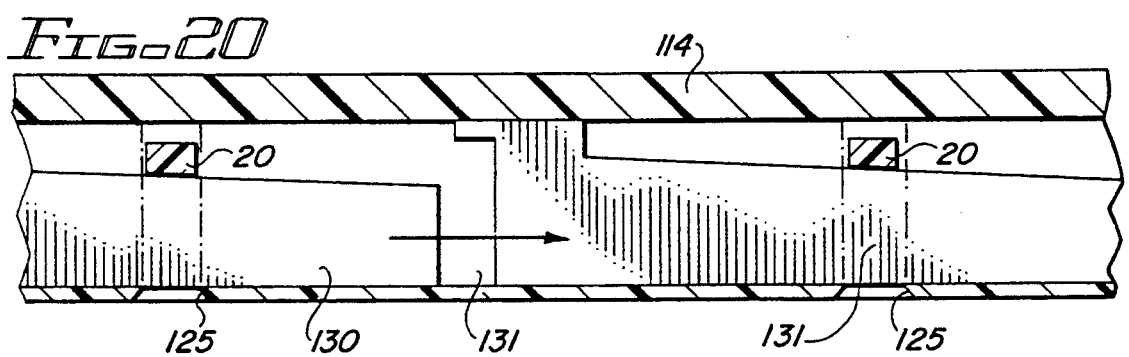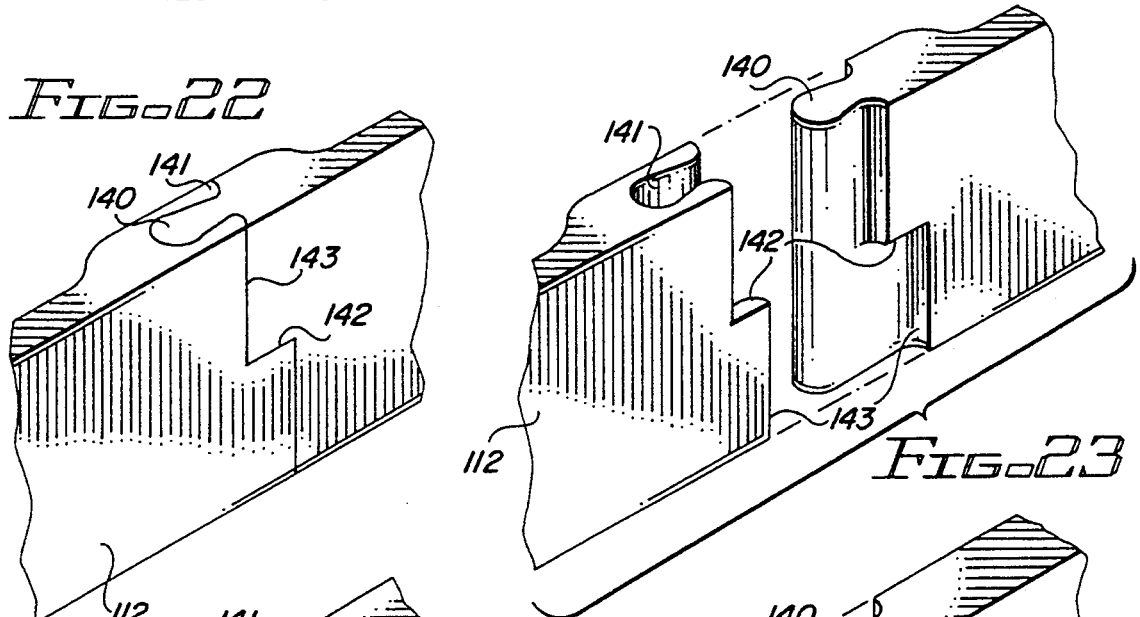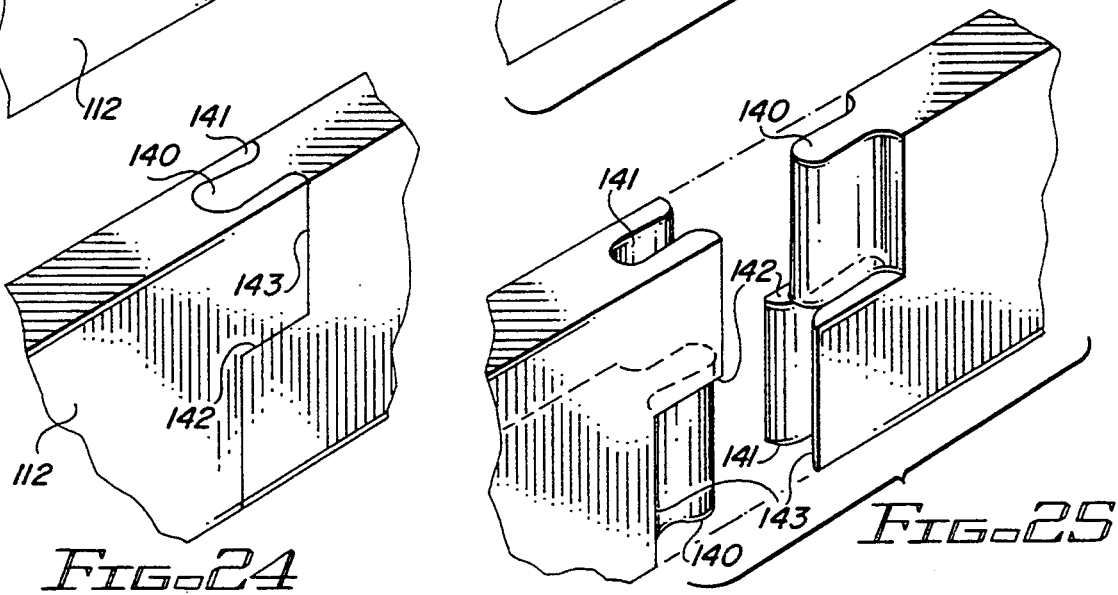

MULTIPLE WEDGE DETACHABLE CONNECTION AND CLOSURE AND METHOD OF MAKING

A. INTRODUCTION

This is a continuation-in-part of application Ser. No. 07/752,846, filed Aug. 30, 1991, U.S. Pat. No. 5,201,109, which was a continuation-in-part of application Ser. No. 07/617,506, filed Nov. 23, 1990, and now abandoned. The entire disclosure of application Ser. No. 07/752,846 as filed on Aug. 30, 1991 and now U.S. Pat. No. 5,201,109, is incorporated herein by reference.

The claimed invention is for a method, apparatus and kit incorporating multiple wedges for detachably joining one object to another. In the particular embodiments disclosed, a high integrity, detachable, sealed connection between two cylindrical objects is quickly accomplished with the exertion of minimal closure forces.

B. THREE DISCLOSED EMBODIMENTS

For the purpose of illustrating the versatility of the present invention, three examples are described in which the resulting connection is subjected to the conflicting and often severe demands of: pressure, vacuum, pulse, chemical and ultraviolet exposure, price competition, ease of use and consumer convenience.

The first embodiment is a detachably connectable lid for use on debris traps located at the input to high head, high volume pumps. The second embodiment is a lid for easily, securely, and repeatably, reclosing and resealing containers such as standard five-gallon buckets. The third embodiment is a quick connect/disconnect fitting for use in joining RODS,tubes, pipes or hoses while providing a high integrity seal against pressure and/or vacuum. All of the embodiments are described in terms of methods, structures and kits which can be adapted for: (a) retrofitting existing devices; or, (b) direct incorporation as an integral part of original equipment.

Also disclosed in conjunction with the second embodiment of the invention is a novel structure for providing a snap connection between component parts which, in certain applications, serves to greatly facilitate assembly while reducing the size and cost of tooling used in the production of constituent molded or machined components.

Further described in conjunction with the second embodiment is a "pinch to open/pinch to close" feature which allows the user to easily and conveniently make and break the detachable connection without tools and without separately restraining the joined components against rotation. Because this feature operates on the basis of "zero net torque," the connection can be conveniently operated even in the absence of a gravitational field.

Also described in conjunction with the second embodiment are structural variations adapted for use with automatic packaging equipment and for providing a strong detachable connection which is more economical and particularly useful in applications where the connection need not be conveniently remade after it has been broken.

The basic methods and structures of the first two embodiments can be readily adapted for use in joining virtually any two members of circular cross-section and thus may serve as a hose connector, pipe connector, or closures for a cylindrical aperture. The third embodiment exemplifies one form of such a connector. Furthermore, as illustrated and described in the commonly owned, co-pending application Ser. No. 07/752,846 (U.S. Pat. No. 5,201,109), the improvements described and claimed in the present application can also be readily adapted for use in detachably joining flat or linear members of non-circular cross-section.

The three disclosed embodiments are used under substantially different operating conditions in different industries having different structural and economic restraints. Accordingly, the background of each application will be described to provide a better understanding of the advantages of the claimed invention.

C. THE FIRST EMBODIMENT: DETACHABLE LID FOR DEBRIS TRAP

Hydraulic pumps used in many applications require some form of trap or strainer to prevent debris from entering the pump and either limiting or preventing its efficient operation. This is particularly true when the pump is used in an open system such as a swimming pool recirculation system. In these applications, debris is frequently drawn from the open pool toward the pump input.

A debris trap is typically in the form of a cylindrical pot with an input from the swimming pool (or other source) and an output to a pump housing. Between the input and the output is some form of strainer or other filter mechanism which prevents debris in excess of a particular dimension from entering the pump housing. In the case of swimming pool pumps, debris traps typically incorporate a mesh strainer basket made of plastic. Water circulating toward the pump must pass through this mesh basket. These baskets are removable, through an aperture at the top of the debris trap for periodic cleaning and replacement.

As debris accumulates in the trap, liquid flow through the trap and into to the pump is increasingly restricted and the system efficiency is reduced. Because of this, it is necessary to stop the pump, open the debris trap and remove the mesh basket (or other strainer) for cleaning. After this has been done, the basket is replaced, the trap is closed and the pump is started again. The frequency with which this cleaning procedure must be performed depends upon the volume of debris entering the system. In the case of a swimming pool exposed to severe wind or storm conditions, large quantities of leaves, sticks, and other debris can be blown into the system and rapidly collect in the trap, which then must be opened for cleaning. Under severe conditions the debris trap may have to be cleaned two or three times during a twenty-four hour period. Under more normal conditions cleaning may be required on a weekly basis. In some cases the pump is also used as part of a vacuum system used to sweep debris from pool surfaces through a separately connected hose. When a large volume of debris has collected in the pool, the debris trap must be frequently opened and cleaned out during the vacuuming procedure.

Debris traps of the type described are subjected to extremely divergent and often severe operating conditions: They must be capable of being frequently opened and closed and yet provide a consistent seal against installation pressures, against periodic pressure spikes (water hammer) and against startup and operating vacuum at the pump input. While these lids must provide a high integrity seal, they must also be easy to remove and replace, even by untrained individuals and those having limited strength.

Typically, such debris traps and their closures must withstand a positive pressure of at least 100 psi. During swimming pool construction, these lids must maintain a seal when subjected to approximately 35 psi over a period of three weeks. In operation, pressure spikes or pulses as high as 150 psi occur each time the pump is turned off. Most debris traps currently used on swimming pool pumps are approximately six inches in diameter. This means that the inner surface of the closure and the detachable connection must withstand forces in excess of 2800 pounds. Forces of this magnitude are particularly significant when it is understood that the debris trap, closure and connection are made of plastic to provide transparency and chemical resistance while reducing cost.

In most swimming pool applications, the circulation pump is connected to a power source through a timer which is set to turn the pump on and off at least once every 24 hours to control use and save on the cost of electricity. Each time the pump is turned off, a pressure spike (water hammer) occurs at the pump input. Many swimming pools now incorporate in-floor cleaning systems having pop-up cleaning heads which inject periodic jets of water along the pool surfaces to move collected debris to a removal point. (See e.g. U.S. Pat. No. 4,322,860). These pop-up heads are cycled on and off by means of a multiple output sequencing valve which redirects the pressurized flow of water to five or six output ports which are connected to corresponding sets of pop-up jets. (See, e.g. U.S. Pat. No. 3,779,269). Depending upon the design of the sequencing valve, water hammer (pressure pulses) occur each time the water flow is switched or sequenced. This may occur as frequently as every 30 seconds. While these pulses are usually of a lesser magnitude compared to the spikes created when the pump is shut off, their cumulative effect on system components such as the debris trap and its removable lid can be significant.

Being located at the input to the pump, the debris trap and its closure also are subjected to vacuum conditions during normal operation. In addition, a significant vacuum pulse occurs each time the pump is started. This startup vacuum is sufficient to cause observable closed system cavitation. Air leakage at the trap closure can result in reduced pump efficiency, inability to initiate or maintain pump prime and, in some instances, may lead to long-term cavitation damage to the pump impeller.

In addition to sealing against high pressure and vacuum conditions, the debris trap closure must also be capable of withstanding long-term exposure to: (a) relatively high concentrations of oxidating agents such as chlorine and bromine; (b) a wide range of acidic and alkaline conditions; (c) ultraviolet light form the sun; and, (d) a wide range of operating temperatures (e.g. 10°–135° F.).

While there are a number of structures and materials currently available for use in the production of debris trap closures which will function under many of the conditions described above, there has been no satisfactory method or apparatus for quickly and easily connecting and disconnecting a transparent leaf trap closure so as to assure a positive and repeatable seal with respect to high pressure, pressure spikes and vacuum while resisting the adverse affects caused by exposure to oxidizing agents, algicides, acids, bases and sunlight. The object of the present invention is to provide a method, apparatus and retro kit for achieving these objectives.

In the past, closures for debris traps have fallen into three basic categories. Until the 1970's most swimming pool pumps and their associated debris traps were made of brass and the lids were essentially brass plates removably secured to the top of the trap by two thumb screws which engaged threads located 180° apart along the upper circumference of the trap. These, of course, were not transparent and therefore had to be removed to determine whether the trap required cleaning. By the early 1980's most pool pump manufacturers had abandoned brass in favor of plastic, which is less expensive, readily moldable, resistant to chemicals and available in transparent compositions.

Some manufacturers use plastic lids for debris traps which are connected by two thumb screws—the same basic technique which had been traditionally used to connect brass closures. However, these plastic lids often lack the structural rigidity of brass and, especially in the case of larger diameter traps (e.g. 6 inch and over), these often leak when pulsed at high pressure or when exposed to higher installation and test pressures (e.g. 35–100 psi). A major contributing factor to this leakage is the failure of this form of connection to uniformly distribute closure forces around the circumference of the lid. Instead, closure forces are concentrated at only two diametrically opposed points, allowing outward distortion of the plastic lid at elevated pressures. Numerous attempts have been made to minimize this distortion by increasing the rigidity of the lid through incorporation of heavy structural ribs and cells. This has added to the expense of production; and, the added structure reduces visibility through the debris trap lid. The debris traps included on many pumps are representative of this prior art approach.

A second and distinctly unsuccessful technique for detachably connecting a closure to a debris trap aperture has involved the use of well-known compression bands. Compression bands typically consist of a stainless steel band having an inwardly open "U" or "V" shaped cross-section which circumferentially engages tapered flanges extending from the lid and from the upper portion of the debris trap. A threaded T-bolt engages loops formed at the ends of the band and a nut or threaded knob is tightened to draw the two ends of the compression band over the mated flanges. As the nut or knob is tightened on the T-bolt, the circumference of the compression band is reduced and the flanges are pulled into the V-shaped band and into face-to-face contact with one another. These compression bands are difficult to attach and remove. They are subject to over and under tightening during attachment. They often bind during installation. This results in excessive, insufficient or uneven force distribution and resulting wear, leakage or breakage. When overtightened, compression bands cause stress fractures in plastic lids which can then fail mechanically in response to flexure as the lid is repeatedly cycled between startup vacuum and the pressure spikes which occur when the pump is shut off. The debris traps included on American (Americana) brand pumps are representative of this prior art approach.

Probably the most successful prior art method for connecting a clear plastic lid to a debris trap involves the use of a threaded lid. External threads around the base of the lid engage corresponding internal threads around an aperture at the top of the debris trap. This "threaded lid" method is used on swimming pool pumps sold widely under the StaRite and PacFab brands in the United States and the Astral brand in Europe. While these lids function under most operating conditions, they are extremely difficult to remove after they have been left in place for several on/off cycles of the pump. Apparently threaded lids incrementally tighten each time they are subject to a sharp pressure spike. These pressure spikes cause upward and outward deformation of the plastic lids followed by a relaxation as the spike subsides. This expansion and constriction causes incremental rotation of the entire threaded lid with corresponding tightening of the connection between the lid and the threaded body of the trap. This pulse-related tightening also apparently occurs—to a lesser extent but much more frequently—when the flow of pool water is switched between groups of pop-up jets used in pool cleaning systems of the type previously described. Similarly, contraction followed by expansion is observable when debris trap lids are subjected to the sudden vacuum associated with pump startup.

Pulse tightened lids can become so extremely difficult to remove, that pool owners fail to clean out the debris traps as often as needed, resulting in progressively decreased flow to the pump, increased back pressure, loss of efficiency and, in some cases, permanent pump damage. Often pool owners use tools such as pipe wrenches, channel locks and hammers to loosen the pulse tightened plastic lids. This can result in stress fractures or breakage of the plastic lids. To address this hydromechanical tightening problem, one of the leading manufacturers of pool pumps has modified the upper surface of its debris trap lids to incorporate two heavily reinforced turning lugs. This manufacturer includes a label on its lids instructing users to insert a long board between these lugs to gain the rotational leverage necessary to loosen the pulse tightened lids. In addition, manufacturers of threaded lids recommend frequent lubrication of the O-ring seal. These present the state of the art methods for dealing with the problem of overly tightened debris trap lids.

O-ring shear is another problem associated with the sealing of prior art threaded lids. O-ring gaskets, when properly utilized, can provide a highly effective seal between mechanically connected parts. O-ring seals function optimally when physically restrained in a mechanical seat and subjected to predetermined, uniformly distributed, compression. Performance degrades when compression is not uniform or when the seal is subjected to shear during installation. This is particularly true in the case of mechanical connections that must be repeatedly disconnected and reconnected. The O-ring gaskets in all currently available threaded debris trap lids are subjected to substantial shear, both when the lid is installed and, to an even greater extent, when the lid is subjected to extreme pulse-induced tightening. In threaded lids, O-ring lubrication represents the state of the art treatment of the problems associated with O-ring shear.

When the connection of the present invention is used in applications such as debris trap lids, the following objectives are addressed: (a) The lid can be easily and quickly installed and removed by hand, without the exertion of high torque or the use of tools. (b) The lid connection, while subjected to high pressure pulses, cannot be tightened by these pulses. (c) The O-ring seal at the detachable connection is placed only in uniform compression, without any rotational shear during installation, operation, removal or repeated reinstallation. (d) The detachable connection repeatedly seals and reseals the debris trap opening against high installation pressures, high pressure spikes, operating vacuum and the significant negative pressure (vacuum) associated with pump startup. (e) The constituent parts may be made of moldable plastic which resist chemical and ultraviolet degradation. (f) The lid can be configured as a lens from transparent material and without obstructing reinforcements, handles or removal lugs, allowing optimal viewing of trap contents. (g) The lid can be repeatedly connected and disconnected without the need for repeated applications of messy lubricants. (h) The improved combination can be incorporated as an integral part of newly manufactured debris traps and, by means of a retrofit kit, it can be used on existing debris traps designed to receive various forms of prior art lids.

D. THE SECOND EMBODIMENT: RESEALABLE BUCKET LID

A second application where the detachable connector of the present invention has particular utility is as a resealable connection between a cylindrical container and a corresponding lid. For example, inexpensive five-gallon plastic buckets or pails are widely used for containing, storing and transporting a wide variety of dry and liquid materials such as seeds, food products, fertilizers, pastes, paints, lubricants, chemicals, and toxic wastes. Many techniques and many structures have been used to connect, disconnect and, to some extent, seal lids on these buckets. Many methods and structures have been used for making the connection secure or tamperproof. In most cases, once the lids have been secured to the buckets, they are extremely difficult to remove. Removal often requires the use of a knife, screwdriver, hammer, lever or some combination of these tools. Typically, it is difficult or impossible to reconnect the lids and to reseal buckets with the original level of mechanical and sealing integrity. For this reason, such containers have been generally viewed as disposables, not suitable for repeated reuse or for frequent access storage.

Two types of connections have found some application where reconnection and resealing of the lids to buckets is important. For example, in the case of dry chlorine sold to consumers for use as an oxidizing agent in sanitizing swimming pools, some firms distribute their products in "resealable" containers. One version of such a container has a threaded lid. Another uses a compression band which is locked into engagement over flanges on the bucket and lid by means of a circumferential latch attached to a hand lever.

Both of these connections have a number of undesirable features. The molds required to produce internal and external threads are expensive and increase production costs without providing a corresponding performance benefit. The threaded connection subjects any gasket between the bucket and lid to shear, reducing its effectiveness. The associated friction makes removal difficult once the lid has been tightened sufficiently to crush the gasket and provide the desired seal. Also, because the bucket and lid are of a large diameter (typically 12 inches) removal of the sealed lid requires the application of substantial torque to the lid while the bucket is simultaneously restrained against counter rotation. This often requires either two people or one person's dexterous use of both hands and both feet. One manufacturer provides heavy radial ribs on the top of its threaded lids and instructs the use of a hammer to pound on these ribs to loosen the lid prior to removal. Positive resealing of such buckets requires a similar effort. To avoid this difficulty, consumers often refrain from adequately retightening the lids. This allows moisture to enter the container and, in the case of chlorine, to produce extremely toxic vapors which can leak out to contaminate the storage area and collect in higher concentrations with the bucket, creating a high risk of inhalation when the lid is next removed. Where a large number of inadequately sealed chlorine containers are on display for sale in a retail store, the smell of chlorine can range from unpleasant to overpowering.

Compression band connections when used with bucket closures are subject to the same inconveniences and difficulties described previously in relation to their use on debris traps. In addition, because of the higher forces required to close a larger diameter bucket with a compression band, these bands must be made of steel, further adding cost and waste to a container typically designed for disposal after one use.

Compression bands are produced as a separate part, unconnected to either the lid or the bucket. Each time they are removed, they are subject to misplacement or accidental deformation. Each time they are reconnected, they must be carefully realigned with the mating flanges on the large diameter lid and bucket. These flanges must themselves be aligned and carefully held in position to restrain a large diameter O-ring or annular gasket between the lid and container while the compression band is set in place and then tightened. This process requires levels of skill, dexterity, experience and patience beyond those associated with the ordinary consumer. As a result, this form of connector lacks the effectiveness and convenience necessary for use on a container intended for easy, quick and frequent reclosure.

When the present invention is incorporated as a detachable connection between a bucket and a corresponding lid, the following objectives are accomplished: (a) The lid can be quickly and easily connected to and disconnected from the bucket with minimal force and without the use of tools or separate components. (b) The connection between the lid and bucket can be repeatedly sealed and unsealed through the uniform compression of an O-ring or other gasket retained in the lid and without any shear inducing, high friction, rotational movement between the lid and the bucket. (c) A heavy multipoint connection between the lid and bucket creates a solid mechanical attachment comparable in strength to the bucket itself while uniformly distributing closure forces around the bucket circumference. (d) The connection between the lid and bucket can be made or broken with very limited physical movement and limited physical force. (e) A high integrity connection between the lid and bucket can be more readily achieved by incorporating pairs of handles which, when easily pinched together, result in the positive locking or unlocking of the lid without subjecting the entire assembly to net torque. (f) The connection can be readily adapted to incorporate a number of known mechanisms for achieving either positive or tamperproof closure. (g) The improved lid connection can be incorporated as an integral feature on new buckets or adapted for use in retrofitting buckets which are widely available from many manufacturers. (h) The connection can be modified for economical use with automatic packaging equipment and for applications where remaking of the detachable connection is of decreased importance.

E. THE THIRD EMBODIMENT: DETACHABLE HOSE AND TUBE CONNECTOR

A third application where the connector of the present invention has significant utility is in providing a quick connect/disconnect between rods or hoses, tubes and pipes used to convey or contain fluids under pressure and/or vacuum conditions.

There are a number of well-known techniques for connecting fluid carrying tubes and hoses. These include: (a) The use of tapered (plumbing) threads which are tightened to a point of controlled thread deformation. (b) The use of straight threads for applying preloading forces to a gasket enhanced face seal. (c) The use of various forms of expansion and compression rings, to deform and/or entrap a tube or hose at the point of connection. (d) The use of circumferentially distributed bolts or clamps to draw facing flanges together while engaging and intermediate gasket material. (e) The use of pivoted or flexible compression rings which engage and draw together facing pipe flanges. (f) The welded or adhesive connection of metallic or plastic tubes.

Some of the prior art connections are designed for use only in pressure applications, some for use only in vacuum applications, some are designed to achieve a permanent rigid connection, some are usable only with hoses, deformable tubes or specially prepared or fabricated pipes. All of the prior art connections are relatively difficult to make, many require precise application of torque for optimal results, many require significant preparation time, many require substantial space and skill for successful connection. Most cannot be readily, reliably or repeatedly disconnected and reconnected. Most require tools for proper completion of the connection especially in applications involving relatively high pressure or low vacuum.

As with all cylindrical connections, the larger the internal cross-sectional area, the greater the problem associated with sealing against higher pressure and lower vacuum. These effects increase in direct proportion to the square of the radius. Likewise, the torsional forces required to make many such joints, increases in direct proportion to increasing radius, thus requiring the use of wrenches and spanners even at relatively small diameters. These increased forces act on the structure of the connection itself and operate to cause distortion of any gasket material used to enhance the sealing characteristics of the joint.

There are many quick connect/disconnect devices available for use with hoses, tubes and pipes. These include: (a) push on and sliding collar connectors used on garden hoses and air hoses; (b) larger diameter "cam lock" connectors such as those sold by Dixon Manufacturing Company, (c) single and double bayonet type connections such as the larger diameter connectors made by Angus and intended for use in intermediate pressure applications such as firefighting; (d) smaller diameter quick disconnect devices such as those sold under the "Swage Lock" and "Snap-tite" brands for use in intermediate to high pressure applications; and (e) various high pressure hydraulic disconnectors.

All of the prior art quick connect/disconnect devices typically suffer from some combination of disadvantages: some require tools to precisely make and break the connection, some can be used only in very low pressure applications; some are adapted primarily for use in vacuum applications; and some are made from a large number of individual structural components. Some of these prior art connectors are characterized by an inside diameter which is less than about 50% of the connector's maximum outside diameter. This results in one of two undesirable conditions: either the reduced inside diameter is significantly less than the tubes or hoses being connected (thereby resulting in flow restriction) or the outside diameter of the connector is excessively large when compared to the tubes or hoses being connected (resulting in heavy, bulky joints subject to interference with other components and requiring additional clearance for assembly and disassembly). In either case, a connector that has an inside diameter which is only one-half of its outside diameter has a usable (internal) cross-sectional area which is only 25% of its total cross-sectional area. The excessive complexity and wall thickness of prior art quick disconnects makes them expensive and undesirable.

Objects of the present invention, when embodied in quick connect/disconnect fittings for use with tubes, hoses and pipes include the following: (a) providing connectors with a high ID/OD ratio; (b) providing connectors which can be adapted to function in substantially all industrial ranges of pressure and vacuum; (c) providing a connection which can be economically produced from plastic, metal or other semi-rigid materials; (d) providing a connection which consists of a minimum number of separately manufactured components; (e) providing a connection which can be made and broken with limited rotational motion and with minimal force; (f) providing a connector which can be made and broken without tools; (g) providing a connector design which can be readily scaled for use with a wide range of large and small diameter hoses and tubes; (h) providing a connector which will seal under both vacuum and pressure conditions; (i) provide a connector which forms a rigid joint capable of transferring substantial torque between connected tubes or pipes without tightening, distortion or leakage; (j) providing a connector which uniformly compresses any intermediate gasket material without shear; (k) providing a connector suitable for higher pressure applications which does not require high torque preloading of a face seal; (l) providing a connector which can incorporate positive safety locks to prevent inadvertent disconnects under pressure; (m) providing a connector which can be easily made and broken in only a few seconds by unskilled workers yet repeatedly form a high integrity connection and seal; (n) providing a connector capable of embodying substantially all of the foregoing characteristics and features.

F. SUMMARY OF THE INVENTION

When used to detachably connect two cylindrical structures exemplified by the three embodiments briefly described above, the invention includes the following: (a) A first cylindrical structure having a plurality of pins radially extending from its exterior surface; (b) a second cylindrical structure having at least one bearing member radially extending from its exterior surface; (c) means for axially aligning the two cylindrical elements so that the pins and bearing member are in predetermined juxtaposition with respect to one another; and (d) a plurality of wedges detachably located between the pins and bearing member(s) to forcibly separate the pins and bearing member(s) thereby detachably connecting the first and second cylindrical structures. In operation of the various embodiments, a plurality of interconnected wedges are rotated through less than 180° and the wedges are thereby advanced between corresponding pins and bearing member(s), forcing the pins and bearing members apart and drawing the first cylindrical structure into locked engagement with the second cylindrical structure. In addition, an O-ring or other deformable gasket can be compressed a predetermined amount between the first and second cylindrical structures as the wedges are advanced between the pins and bearing member(s). In various embodiments, the wedges are connected to or integrally formed with the inner surface of a collar which is concentrically rotatable about the common axis of the first and second cylindrical structures when they are in their predetermined juxtaposition. In another embodiment, at least one handle is connected to the wedge collar and an adjacent handle is connected to an outer surface of the second cylindrical structure. These handles, when drawn or pinched together, serve to rotate the wedges with respect to the pins and bearing member(s) to either lock or unlock the first and second cylindrical structures. In another improved embodiment, the wedge collar is formed in two substantially identical semi-cylindrical parts which are snapped together or otherwise joined for concentric rotation around said second cylindrical structure. In other embodiments, at least one of the first or second cylindrical structures is closed at one end and forms a cover or closure for the other cylindrical structure. In still other embodiments at least one of the first or second cylindrical structures include means for connecting one end thereof to another cylindrical structure or aperture, thereby retrofitting the other structure or aperture to incorporate the detachable connection of the present invention.

Other features and advantages of the claimed invention, both as applied to circular and linear structures, will be apparent from the following detailed disclosure.

G. DESCRIPTION OF THE DRAWINGS

FIGS. 1–11 illustrate various aspects of a first embodiment of the invention in the form of a detachable lid for a debris trap. FIGS. 13–29 illustrate various aspects of a second embodiment of the invention in the form of a detachable lid for a commercially available five-gallon bucket. FIGS. 30–38 illustrate various aspects of a third embodiment of the invention in the form of, a quick connect/disconnect fitting for use in joining hoses, tubes, pipes, rods and other cylindrical structures.

FIG. 3 is an exploded perspective view of the principal components which are combined to make the first embodiment of the invention in the form of a kit of assembled components for use in retrofitting an existing debris trap.

FIGS. 4 through 7 are, respectively, partial sectional views taken at sections 4—4 through 7—7 in FIG. 3.

FIG. 8 is a planar view from perspective taken at 8—8 in FIG. 3, illustrating the functional interrelation between the pins, wedges and bearing member(s) of the first embodiment of the invention.

FIG. 9 is a partial sectional view of an assembled first embodiment of the invention when installed to retrofit an existing debris trap.

FIG. 10 is an expanded partial section of the basic components shown in FIG. 9 except where the invention is fitted to a debris trap manufactured with integral pins.

FIG. 11 is a partial sectional view of the threaded retrofit base shown in FIG. 9 and its relation to the threaded aperture in an existing prior art debris trap.

Figure 13:
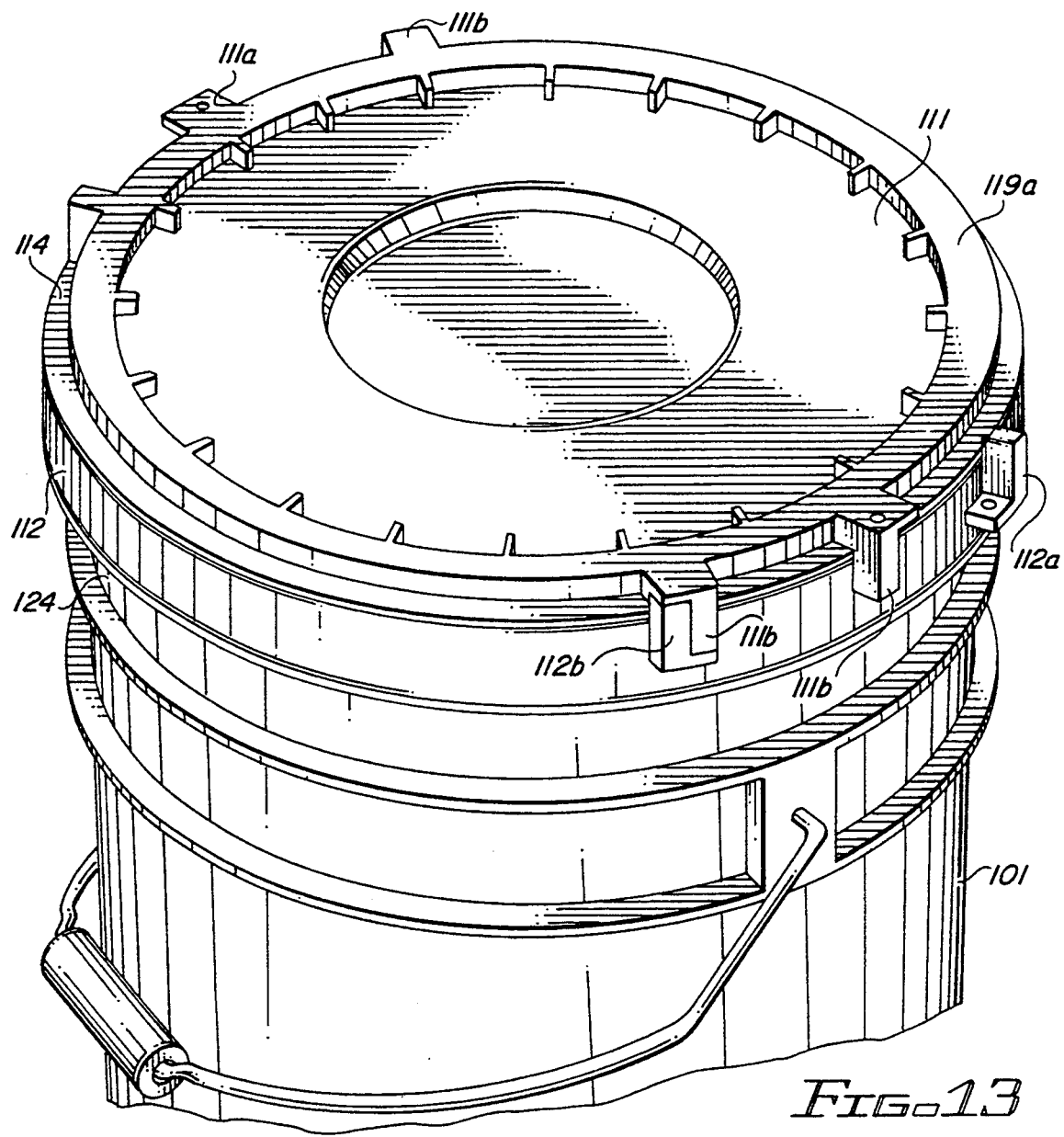

FIG. 13 is a perspective view of the second embodiment of the invention installed on a commercially available five-gallon bucket and with the lid in the open or unlocked position.

Figure 14:
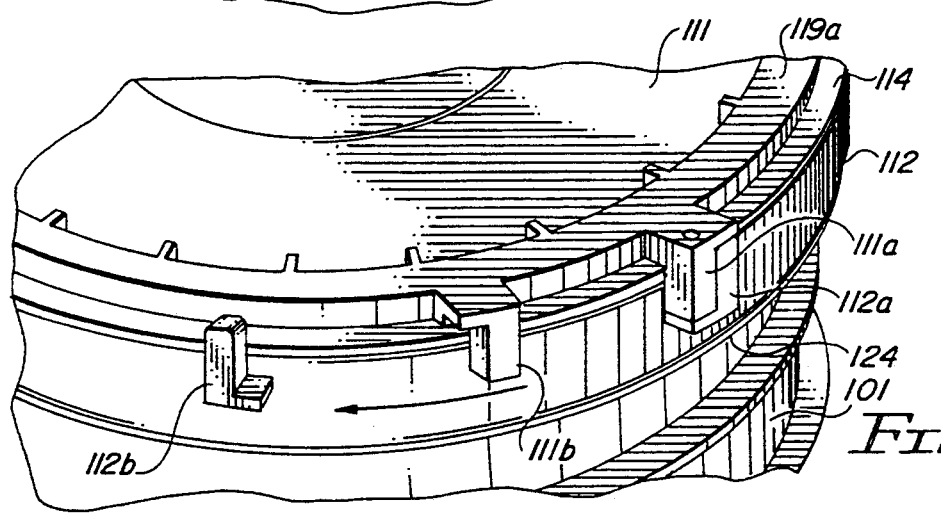

FIG. 14 is a detailed view of one portion of FIG. 13 showing the lid in the closed or locked position.

FIG. 15 is a partial perspective view of the second embodiment of the invention shown in FIG. 13 with the lid removed to expose the top of a standard bucket retrofitted with a pin collar adapted to receive and secure the lid to the bucket.

FIG. 16 is a partially sectioned top view of the pin collar of FIG. 15 illustrating the relation of parts and one means for connecting the ends of the pin collar when retrofitted on a bucket.

FIG. 17 is a partially sectioned top view of one portion of the lid showing the relation between parts when the wedge collar is in the open or unlocked position illustrated in the perspective view of FIG. 13.

FIG. 18 is a partially sectioned top view of one portion of the lid showing the relation between parts when the wedge collar is in the closed or locked position illustrated in the perspective view of FIG. 14.

FIG. 19 is a planar view of an inner portion of the lid as shown in FIG. 17 further illustrating the functional relation between the wedge collar and lid when they are in the open or unlocked position.

FIG. 20 is a planar view of an inner portion of the lid as shown in FIG. 18 further illustrating the functional relation between the wedge collar and lid when they are in a partially locked position with respect to the pins.

FIG. 21 is a sectional view through the upper portion of the bucket and pin collar taken at section 21—21 in FIG. 15.

FIGS. 22 and 23 show a detailed perspective view of a novel snap connection for joining together segments of the pin collar when it is installed on the bucket or for joining segments of the wedge collar when it is installed on the lid.

FIGS. 24 and 25 show another form of the snap connection illustrated in FIGS. 22 and 23.

FIGS. 26 through 29 are partial sectional views showing alternative wedge configurations particularly adapted for use in conjunction with automated packaging equipment for detachably connecting a lid to a bucket.

Figure 30:
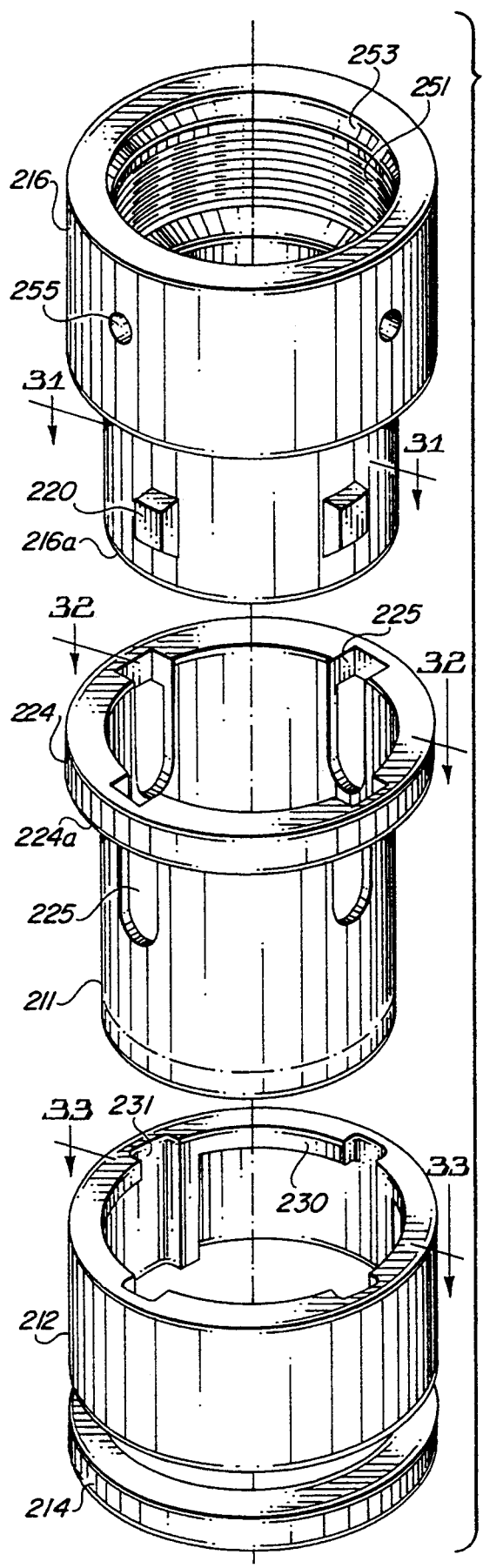

FIG. 30 is an exploded perspective view of a third embodiment of the invention showing the principal components of a quick connect/disconnect fitting for use with hoses, tubes, pipes, rods and other cylindrical structures.

Figure 31:
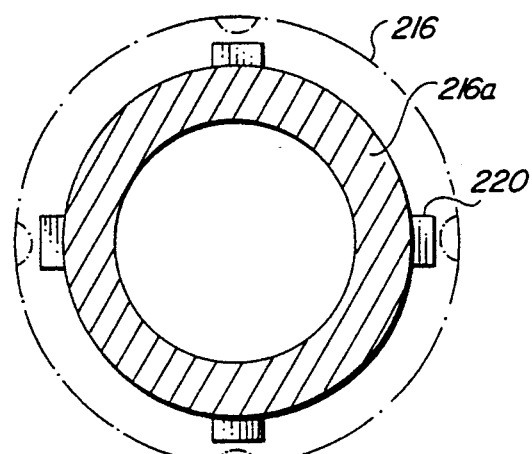

FIG. 31 is a view of a first cylindrical structure taken at 31—31 in FIG. 30.

Figure 32:
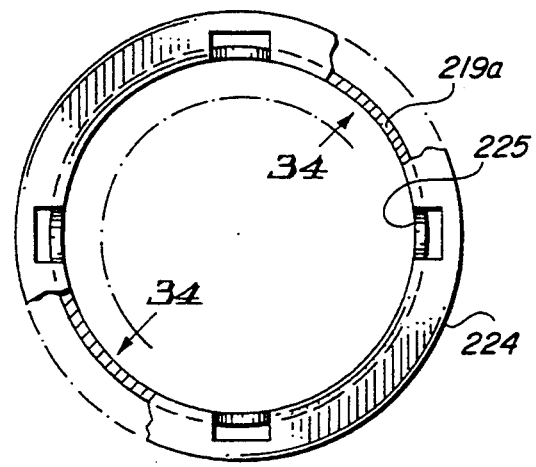

FIG. 32 is a partially cut away end view of a second cylindrical structure taken at 32—32 in FIG. 30.

Figure 33:
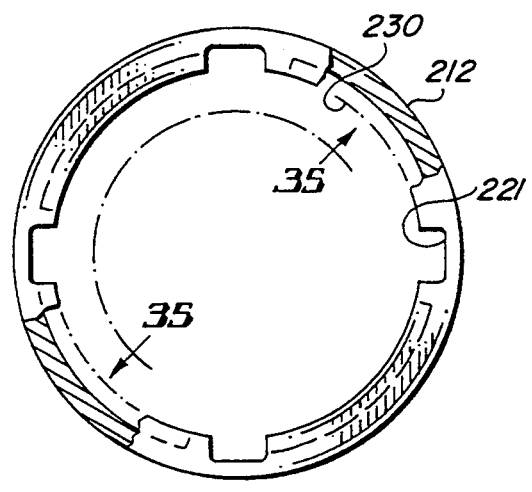

FIG. 33 is a partially cut away end view of the wedge collar taken at 33—33 in FIG. 30.

FIG. 34 is a partial internal view of the second cylindrical member taken at 34—34 in FIG. 32.

FIG. 35 is a partial internal view of the wedge collar taken at 35—35 in FIG. 33.

FIG. 36 is a partially sectional view of the two cylindrical structures moving into predetermined juxtaposition.

FIG. 37 is a partially sectional view of the first and second cylindrical structure aligned and oriented in a predetermined juxtaposition with the wedge collar co-axially oriented for movement into its operational position.

FIG. 38 is the same as FIG. 37 with the wedge collar moved into its open or unlocked position.

FIG. 12 is the same as FIG. 38 with the wedge collar rotated into its closed or locked position.

H. DETAILED DESCRIPTION OF FIRST EMBODIMENT

Figure 1:
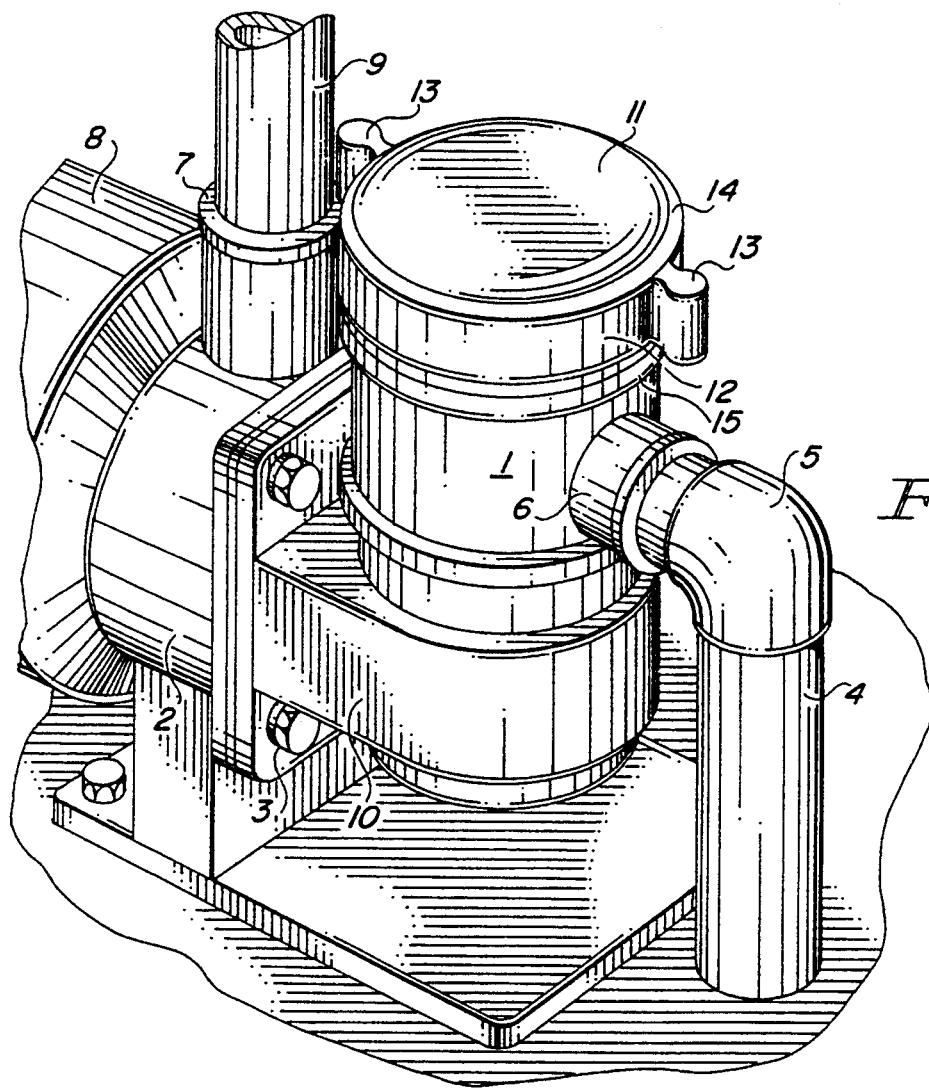
FIG. 1 is a perspective view of the first embodiment of the invention shown installed on a generic form of debris trap connected to a pump housing.
Figure 2:
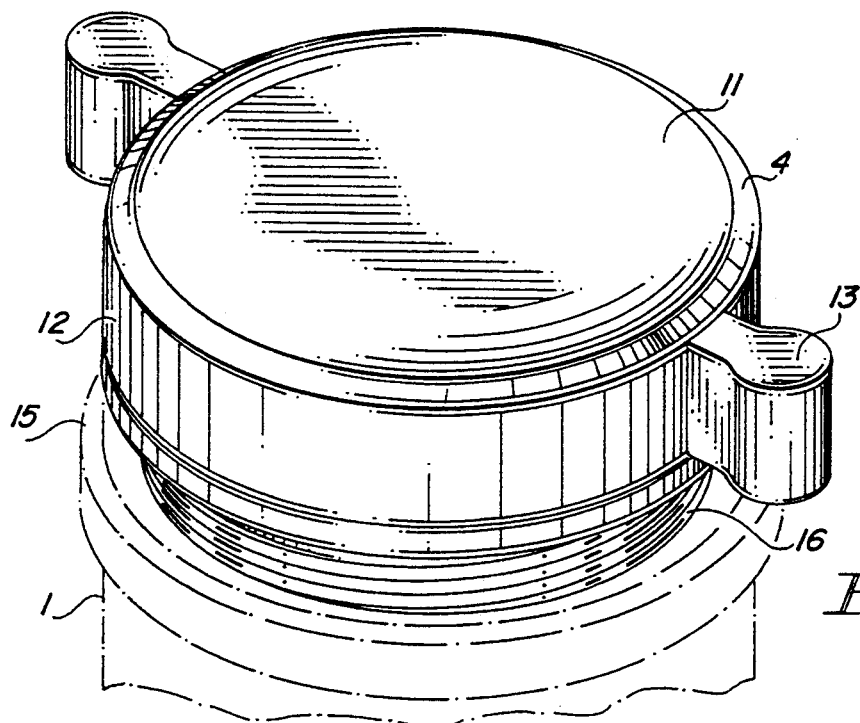
FIG. 2 is a perspective view of the first embodiment of the invention in the form of a retrofit device for installation on a prior art debris trap (shown in broken lines).

FIGS. 1 and 2 are perspective views of one embodiment of the invention incorporated in a quick connect/disconnect closure for use on a debris trap located at the input to a pump. The view in FIG. 1 shows the closure installed on a debris trap 1 which is specifically adapted to receive the closure. The closeup view in FIG. 2 shows such a closure installed by means of an adaptor base 16 on a debris trap 1 (shown in broken lines) of the type designed to receive a prior art threaded lid.

Referring to FIG. 1, the debris trap 1 is depicted in a generic form, rather than the configuration of any particular manufacturer. The debris trap 1 is connected to a pump housing 2 by four symmetrically located bolts 3. The pump housing 2 is connected to a motor 8 which turns an internal pump impeller (not shown). Pipe 4 is connected by an elbow 5 to an inlet port 6 of the debris trap 1. Pump housing 2 has an outlet port 7 which is connected to pipe 9.

In operation, the motor 8 turns the pump impeller within housing 2 causing a vacuum within debris trap 1 which, in turn, draws fluid in from pipe 4 via inlet port 6. The fluid flows downward through the debris trap 1, through a strainer (not shown) and, via an internal opening in the lower section 10 of debris trap 1, past the pump impeller within housing 2 and out through the pipe 9. In an application such as a swimming pool, water is drawn from the pool via pipe 4 and conveyed to a filter via pipe 9. After passing through the filter, the water is returned to the swimming pool via other pipes (not shown).

The embodiment of the invention shown in FIG. 1 consists of only three structural components. A clear domed lid 11, a rotatable collar 12 having two integral handles 13 and a retainer ring 14 which, among other things, holds collar 12 in position over lid 11. Not shown FIGS. 1-3 but described in conjunction with FIGS. 9 and 10 is an O-ring gasket 19 constrained within an annular seat 19(a) located on the inside of the lid 11.

Lid 11 may be molded from a high impact, transparent plastic, preferably polycarbonate. The collar 12 and retainer 14 are preferably molded from a different kind of plastic characterized by intermediate compression and shear strengths, preferably ABS. Although the collar 12 can be made from the same plastic (polycarbonate) used to produce the lid 11, it has been found that somewhat improved operation results (specifically, lower friction) when the materials used for these two components are not the same. Furthermore, because they are subjected to lower forces, it is possible to use a less expensive grade of plastic for the collar 12 and retainer 14.

In FIG. 1, the upper portion 15 of debris trap 1 is specially configured to receive the detachable closure of the present invention. The structure of this special configuration, while not shown in the perspective view of FIG. 1, will be described below in conjunction with the lower portion of FIG. 10.

In FIG. 2 the upper portion 15 of debris trap 1 (shown in broken lines) is designed to receive a prior art threaded lid. In this alternative embodiment, a threaded adaptor base 16 is screwed into the aperture through the upper portion 15 of debris trap 1. The upper portion of the adaptor base 16 is configured to receive the detachable closure consisting of the lid 11, collar 12 and retainer 14. This arrangement allows the closure to be used on existing debris traps. The adaptor base 16 is shown in detail in FIGS. 3 and 11. The upper portion of adaptor base 16 is structurally and functionally equivalent to the upper portion 15 of the debris trap 1 shown in FIG. 1 and both will be referred to by the same reference numeral 16 (See FIGS. 9 and 10). The only functional difference between the applications shown in FIGS. 1 and 2 is that in FIG. 1 the debris trap 1 is designed to function as an integral part of the invention while in FIG. 2 the debris trap 1 is designed to function with a prior art threaded lid and must be retrofitted with an adaptor base 16. In the first example (FIG. 1) closures embodying the present invention would be incorporated with the pump and debris trap and sold as original equipment. In the second example (FIG. 2) closures embodying the present invention would be sold as a kit of parts for use in retrofitting an existing debris trap. Obviously the lower portion of the adaptor base 16 could be designed to retrofit any existing aperture/connection, including those prior art systems which use threads, compression bands, split collars, bolted flanges, etc.

FIG. 3 shows the functional components forming a preferred form of the invention embodied in a quick connect/disconnect closure for use on existing debris traps, specifically those designed for use with prior art threaded lids. Included are a retainer ring 14, a collar 12, a domed lid 11 and an adaptor base 16. In the preferred embodiment, the adaptor base 16 is made from the plastic known by its trademark Delrin ®. Also shown is an O-ring 17 which provides a seal between the adaptor base 16 and the upper portion 15 of the existing debris trap 1 when the adaptor base is tightly threaded into position, permanently replacing the prior art threaded lid. Typically, the O-Ring 17 will have been supplied for use with the prior art threaded lid being replaced.

FIG. 9 shows in detail the relation between adaptor base 16, O-Ring 17 and the upper portion 15 of debris trap 1 when assembled together. FIG. 9 also shows a second O-Ring 19 located in an annular seat 19(a) on the inside of lid 11. When lid 11 is detachably connected to the base 16, O-Ring 19 is resiliently deformed (preferably by an amount equal to about 20-30% of its cross-sectional diameter) to provide an improved seal between the lid 11 and the base 16. O-Ring 19 may be of any suitable material and hardness. For example, Buna-N gaskets of 50, 60, 70 and 90 durometer have been tested and the lower hardness values seem to be associated with easier operation although all of the O-Rings provided a functionally acceptable seal during normal operation on prior art pool pumps.

As shown in FIG. 3, the base 16 is a cylindrical structure having a plurality of pins 20 extending radially from an outer surface thereof. The pins 20 are generally rectangular in shape and have a flattened lower surface; however, these pins could be of virtually any shape or configuration so long as they are sufficiently strong to transfer closure forces to the base 16. As shown in the preferred embodiment, pins 16 are formed as an integral of the base 16 although they could be separately connected and made of a different material. Four pins are incorporated in the first embodiment shown in FIGS. 1-12 wherein the diameter of the base is approximately six inches and the expected maximum test pressure is 100 psi with short duration pulses to 150 psi. The four pins measure approximately one-half inch in the axial direction and 1.0" in the circumferential direction. The base has an upper sealing surface 16(a) which in operation compresses O-Ring 19. The cross-sectional diameter of O-Ring 19 and width of sealing surface 16(a) both are approximately one-quarter of an inch in the preferred embodiment. The cross-section of seat 19(a) is sufficient to accommodate the O-Ring in its deformed state. As shown in FIG. 3, reinforcing ribs 21 are included beneath each of the pins 20 to add strength. These ribs 21 have radial dimensions somewhat less than the thickness of the vertical walls of lid 11. Base 16 also includes a circumferential rib or flange 22 to add hoop strength and provide a compression surface for deformation of O-Ring 17 when the adaptor base 16 is threaded onto an existing debris trap aperture as shown in FIGS. 9 and 11.

The domed lid 11 has a convex hemispherical upper portion extending above O-Ring seat 19(a) which is preferably transparent to allow visible inspection of the inner portion of debris trap 1. The lid 11 is otherwise a cylindrical structure having at least one bearing member 24 extending radially around its lower portion. Bearing member 24 includes a bearing surface 24(a) which slidably engages the lower surface of collar 12.

Pin slots 25 extend through the cylindrical wall of lid 11 and partially through bearing members 24 to receive, align and orient pins 20 when lid 11 is installed over base 16. Pins 20 extend radially from the surface of base 16 by a dimension which is less than the radial dimension of the pin slot 25 in the bearing member 24. The circumferential width of each pin 20 is less than the width of each pin slot 25, allowing easy engagement of the lid over the base 16, providing a means for aligning the lid 11 and base 16 in predetermined juxtaposition and providing a mechanism for substantially limiting rotational displacement between the lid 11 and base 16 during and after installation.

In the preferred embodiment, bearing member 24 also adds radial strength to the lower portion of lid 11. As shown in FIG. 3, bearing member 24 and bearing surface 24(a) form a single substantially continuous flange around the base of lid 11. In applications where the radial strength of lid 11 is less important, slots 25 could extend completely through bearing member 24, thereby segmenting it into a plurality of separate bearing members (in this example there would be four such segmented bearing members). This segmented configuration has been found to be adequate in lower pressure and smaller diameter applications. In any case, there must be at least one bearing member extending from the surface of base 16. The configuration, location and structure of the bearing member(s) must only be sufficient to transfer closure forces to the lid 11 as it is detachably connected to the base 16 and as internal pressures urge the lid 11 away from base 16.

As illustrated in FIG. 3, the collar 12 includes a plurality of wedges 30 formed on its inner surface. Specifically, there are four wedges 30, one for each of the four pins 20. The collar 12 also includes four vertical access slots 31 adjacent to the narrowest portion of each wedge 30. These access slots 31 allow the collar 12 to pass over the pins 20 as the lid 11 and collar are placed over the base 16.

FIG. 8 illustrates the functional relation between the pins 20, the wedges 30 and the access slots 31. When the lid 11 and collar 12 are together lowered into position over base 16, each of the pins 20 passes into the pin slots 25 and enters a corresponding access slot 31 until the lower surface of collar 12 engages the bearing surface 24(a). This open or unlocked position is generally illustrated in FIG. 8. As the collar 12 is rotated, each wedge 30 is moved under a corresponding pin 20.

As the wedges 30 advance under the pins 20, the vertical depth of each wedge 30 increases due to the fact that the top surface is, in this embodiment, tapered at an angle with respect to the bottom of the collar 12 and bearing surface 24(a). The angle of taper in this embodiment is preferably less than about ten degrees. An angle of about 1.5 degrees has been tested with good results under pressure and vacuum. It should be noted that the bottom surfaces of pins 20 are preferably flattened to mate with any angle incorporated in the upper surface of wedges 30 to provide a good bearing surface between pins 20 and wedges 30.

FIGS. 5, 6 and 7 are sectional views through the collar 12 as shown in FIG. 3. The section of FIG. 5 is taken through an access slot 31. This corresponds to the the unlocked position of pin 20 as shown in FIG. 8. FIG. 6 is a sectional view corresponding to a fully locked position, where the wedges 30 separate pins 20 and bearing member 24 by a predetermined maximum distance. The sectional view of FIG. 7 is taken at a minimum locked position where the wedges 30 are initially engaged between pins 20 and bearing surface 24.

The bottom of collar 12 engages the bearing surface 24(a) of bearing member(s) 24. As they are advanced under the pins 20, the wedges 30 force the pins 20 and the bearing member 24 apart, thereby drawing the lid 11 and the base 16 into tight uniform engagement. This wedging action between the pins 20 and the bearing member 24 drives the upper surface 16(a) of the base 16 upward against the O-Ring 19 which is deformed and provides a seal against surface 16(a) and the walls of seat 19(a). The rise of the wedges 30 is determined by multiplying the effective length of the wedge times the tangent of the wedge angle. This rise defines the extent to which rotation of the collar 12 (and corresponding advancement of the wedges) results in the deformation or crush of the O-Ring 19. Depending upon the hardness of the O-Ring 19 and the coefficient of friction between the collar 12, the pins 20 and the bearing member(s) 24, the turning force required to properly crush the O-Ring and fully engage the lid 11 on the base 16 will be relatively small. The two optional handles 13 provide additional torque for engaging and disengaging the lid 11 over the base 16. In the preferred embodiment, closure and release is achieved by exerting moderate hand (or finger) pressure against the handles 13. Removal or replacement of the lid 11 can be easily accomplished by hand in approximately 3 seconds.

The optional retainer 14 is used primarily to hold collar 12 in position over lid 11. Retainer 14 also serves to keep debris from falling into the space between the outer surface of the lid 11 and the inner surface of the collar 12. As shown in FIG. 3, the retainer 14 includes four L-shaped clips 14(a) extending downward from the lower surface. Each of these clips 14(a) has a small flange extending radially inward (See FIG. 4).

Assembly of the retainer 14, the collar 12 and the lid 11 is illustrated in the expanded sectional view of FIG. 10. After the collar 12 is placed over the lid 11 with the lower surface of the collar 12 resting on the bearing surface 24(a), the retainer 14 is pushed down over the outside diameter of lid 11. The small flanges on clips 14(a) engage the cylindrical, sides of lid 11 and cause the clips 14(a) to deflect radially outward as indicated by the broken lines in the upper portion of FIG. 10. When the retainer 14 is fully engaged over lid 11, the small flanges snap into the recessed upper portions of slots 25 in lid 11, thereby locking the retainer 14 to the lid 11 (as shown in FIG. 9) and holding the collar 12 in position for concentric rotation around the cylindrical walls of lid 11.

In the illustrated embodiment, retainer 14 further includes four pairs of stops 14(b) shown in FIG. 3. When the retainer 14 is installed on lid 11, the pairs of stops 14(b) are positioned within the circumferential slots 12(a) which terminate in collar stops 12(b). Retainer stops 14(b) engage collar stops 12(b) to limit the rotational movement of collar 12 to approximately 90 degrees. Additional detents (not shown) can be included on retainer 14 and the inner surface of slots 12(a) to retain the access slots 31 in alignment with the corresponding pin slots 25 when the lid 11 is removed from the base 16. These optional detents lightly retain the collar in its fully unlocked position and are easily overcome by manual rotation of the collar 12 after the lid 11 is reinstalled over the base 16.

Another convenient feature illustrated in FIG. 3 are the reverse wedges 32 which run below the collar slots 12(a). As illustrated in FIG. 8, the pins 20 are also constrained along their upper surface by reverse wedge 32. The distance between the opposing surfaces of wedge 30 and reverse wedge 32 exceeds the corresponding dimension of pin 20. Thus, as the collar 12 is rotated and wedge 30 is advanced under the pin 20, the reverse wedge 32 is not in contact with the pin 20 and performs no function (other than providing structural rigidity to the collar 12). However, as the collar 12 is rotated to the fully unlocked position, the pin 20 clears the wedge 30 and enters the upper portion of access slot 31. As this occurs, the reverse wedge 32 engages the top of pin 20 and continued rotation of the collar 12 urges the pin 20 away from the bearing surface 24(a) and slightly separates the lid 11 from the base 16. This reverse wedging action serves to separate the upper surface 16(a) on base 16 from its engagement with O-Ring 19 and allows the release of any internal vacuum that may remain in debris trap 1 after the pump has been shut off. This facilitates removal of the lid 11 from the base 16. FIGS. 5, 6 and 7 show sectional views through the reverse wedge 32 in the unlocked, fully locked and initial locked positions previously described.

In another modified embodiment of the invention, that portion of the reverse wedge 32 to the left of access slot 31 can be eliminated entirely leaving only a short section of reverse wedge 32 directly above access slot 31. This short section of reverse wedge may have an increased downward angle since the force required to overcome any residual vacuum in the debris trap is relatively small and can be easily accomplished over a short rotational distance. Elimination of the non-essential portion of the reverse wedge 32 (to the left of access slot 31 in FIG. 8) also reduces the cost of molding the collar 12.

I. DETAILED DESCRIPTION OF SECOND EMBODIMENT

A second embodiment of the invention is illustrated in FIGS. 13-29. Here a commercially available bucket, pail or other container 101 is retrofitted with a pin collar 116 (See FIGS. 15, 16 and 21) and fitted with a lid 111 having a wedge collar 112 (See FIGS. 13 and 14). In general, the lid 111 corresponds functionally to lid 11 described in conjunction with the first embodiment, pin collar 116 corresponds functionally to adaptor base 16 and wedge collar 112 corresponds to collar 12. As shown in FIGS. 13, 14, and 26-29, the lid 111 includes a bearing member 124 which corresponds to bearing member 24. Lid 111 also includes an optional molded retainer flange 114 which functionally corresponds to the retainer 14 of the first embodiment.

FIGS. 19 and 20 illustrate the structural and functional relationship between the retainer 114, the bearing member(s) 124, the pins 120, the wedges 130 and the short reverse wedges 132. When the wedge collar 112 is in its full open position (shown in FIG. 19) the pin slots 125 through the bearing member(s) 124 are aligned with the access slots 131 in the wedge collar 112. In this orientation, the lid 111 is placed over the container 101 with the plurality of pins 120 moving through pin slots 125 until the lid 111 is fitted down firmly on the lip 116(a) formed around the top rim of container 101 (See FIG. 21). The lip 116(a) is located in an annular seal 119(a) externally in the perspective views of FIGS. 13 and 14 and in sectional view in FIGS. 26-29. Seat 119(a) generally corresponds in function to seat 19(a) shown in FIG. 9.

When the lid 111 is in place, the wedge collar 112 is rotated (as indicated by the arrow in FIGS. 14 and 20) causing the wedges 130 to advance under pins 120 (as shown in FIG. 20) thereby forcing the pins 120 and the bearing member 124 apart and drawing the lid 111 tightly and uniformly down on container 101. Depending upon the contents of the container, a deformable gasket material may be incorporated in the seat 119(a) to provide an improved seal with the upper lip 116(a) of container 101. In the absence of a separate gasket material, the detachable connection of the present invention can be configured to serve only as an unsealed connector. Likewise, an intermediate seal can be provided by choosing wedge and seat dimensions which result in the upper lip 116(a) of the container 101 being tightly forced into seat 119(a) when wedge collar 112 is rotated to its fully locked position, causing resilient or plastic deformation of the seat 119(a) and/or the lip 116(a).

In the second embodiment illustrated in FIGS. 14-29, there are twelve pins 120 spaced 30 degree apart around the periphery of the container 101 with corresponding pin slots 25 in the lid 111 and bearing member(s) 124. This provides for uniform distribution of closure forces and for secure locking of the lid 111 onto the container 101.

As shown in FIGS. 15 and 21, the pins 120 are retrofitted to the container 101 by means of a separate pin collar 116 which is constrained between the underside of lip 116(a) and a first reinforcing rib 116(b) both of which are formed as integral parts of container 101. Obviously pins 120 could be molded as parts of the container 101, thereby eliminating the need for a separate pin collar 116.

For purposes of economy, the retainer 114 may be molded as an integral part of lid 111 in which case the wedge collar 112 may be formed as a unitary component and forced down over a thin and flexible retainer 114. Alternatively, wedge collar 112 can be formed as a flat flexible strip which is wrapped around lid 111 between retainer 114 and bearing member(s) 124. In this case the ends of the strip may be secured together by any convenient form of mechanical, welded or adhesive connection. Many alternative forms of rigid or wrap-around collars may be used, depending upon the particular application as suggested in conjunction with FIGS. 26-29. In the preferred form shown in FIGS. 13 and 14, the wedge collar is composed of two identical half-sections which are snapped together in position around the lid between the retainer 114 and the bearing member(s) 124.

Figure 27:
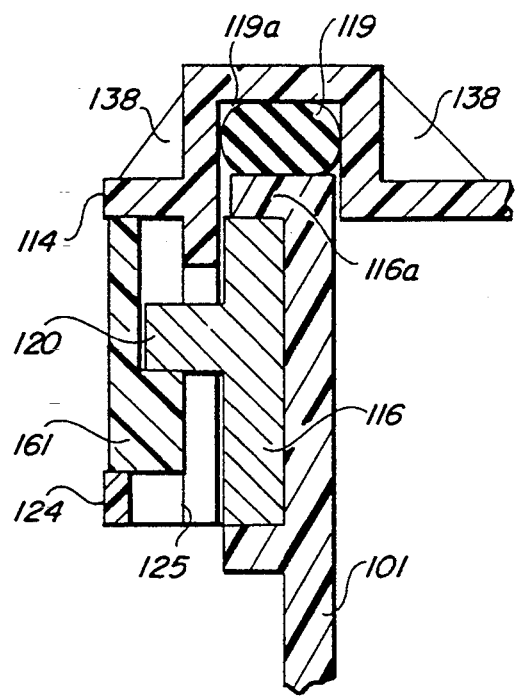
Figure 28:
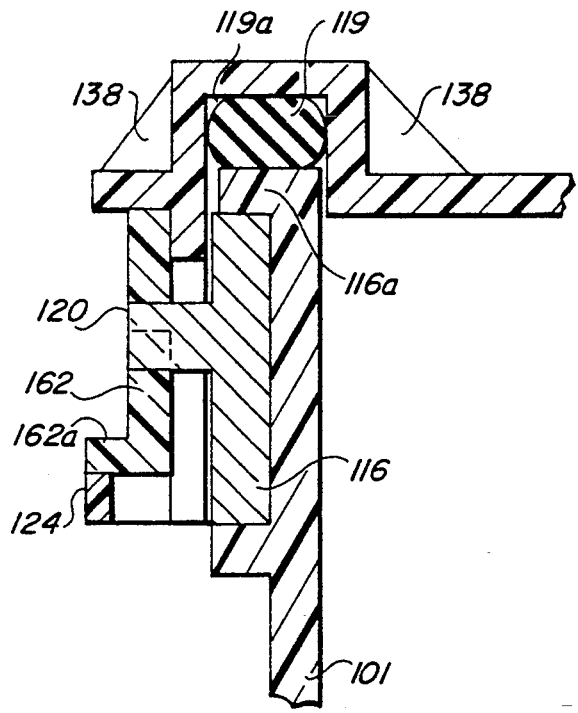
Figure 29:
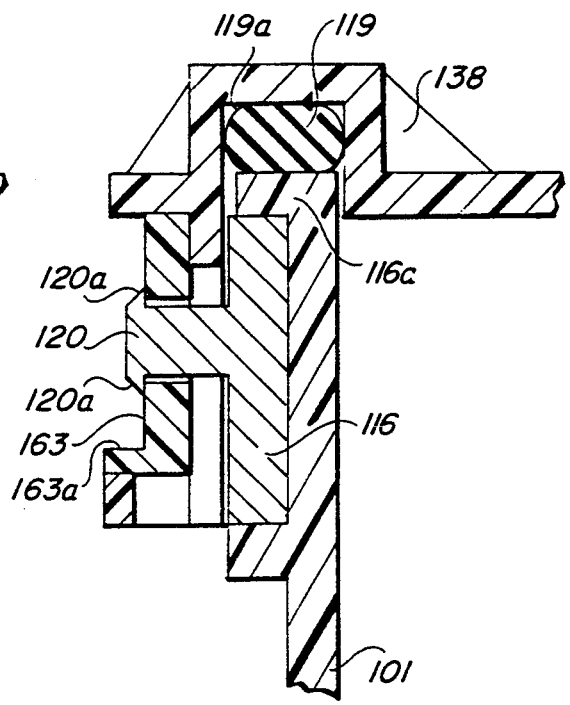

FIGS. 22 and 23 illustrate one form of snap connection suitable for use in connecting the individual half-sections of wedge collar 112. FIGS. 24 and 25 illustrate another form. FIGS. 22 and 24 show the completed snap joints while FIGS. 23 and 27 show the corresponding joints in aligned separation. In both configurations a positive member 140 is forced into engagement with a negative member 141 which resiliently deforms slightly to receive the enlarged end of member 140 and then relaxes to hold member 140 in substantially locked engagement. In the example of FIG. 23, the members 140 and 141 are separately formed on corresponding halves of the joint. In the embodiment of FIG. 25 the members 140 and 141 segmented in mirror image and located on each half of the joint. Mating surfaces 142 limit vertical movement across the completed snap joint while mating surfaces 143 transmit compressive forces across the snap joint. Both of the illustrated configurations shown in FIGS. 22-25 can be machined or molded as integral parts of the identical half segments of wedge collar 112.

Referring to FIGS. 15, 16 and 21, the pin collar 116 is formed as split collar joined at the ends of a single metal spring clip 150 which fits into slots 151 located adjacent to each end of the pin collar 116. Spring clip 150 holds the ends of collar 116 into circumferential engagement over the outer surface of container 101. The pin collar 116 is vertically constrained by upper lip 116(a) and reinforcing rib 116(b). The wall thickness and the outside diameter of containers such as the five-gallon bucket illustrated in FIGS. 13 and 14 often vary. Such buckets are typically manufactured within a wall thickness of 0.070 or 0.090 inches. Because of these variations, together with ordinary manufacturing tolerances, pin collar 116 will typically be subject to rotation around the outer surface of container 101. However, making and breaking the detachable connection between lid 111 and container 101 can be achieved by relative movement of wedge collar 112 with respect to pin collar 116. Pin collar 116 remains in fixed orientation with respect to the lid 111 by virtue of the engagement of pins 120 in pin slots 125.

To facilitate closure, opposing pairs of handles may be connected to the lid 111 and to the wedge collar 112 as illustrated in FIGS. 13 and 14. When these pairs of handles are pinched together, the container 101 is either opened (unlocked) or closed (locked). Handles 111(a)and 111(b) are connected to the lid 111 at diametrically opposed points. Corresponding handles 112(a) and 112(b) are connected to the wedge collar 112 at diametrically opposed points. When handles 111(a) and 112(a) are pinched together, collar 112 rotates relative to lid 111 and the wedges 130 advance under pins 120 forcing the pins and bearing member(s) 124 apart thereby drawing the lid 111 into locked engagement with the pin collar 116. The upper lip 116(a) of container 101 is then forced into seat 119(a) and deforms any gasket 119 located therein.

FIG. 14 shows in detail one side of the bucket/lid combination wherein handles 111(a) and 112(a) are fully engaged in overlapping relation corresponding to a fully locked connection. When handles 111(b) and 112(b) (as shown in FIGS. 14) are pinched together, the wedge collar 112 rotates in the direction of the arrow and the wedges 130 are withdrawn from between the pins 120 and the bearing member(s) 124. In FIG. 13 handles 111(b)and 112(b) are fully engaged in overlapping relation corresponding to the open or fully unlocked position in which the pin slots 125 are aligned with access slots 131 and the lid 111 can be lifted away from engagement with the pin collar 116.

While sufficient closure force can be exerted through the use of only one pair of handles, the preferred embodiment incorporates identical pairs of handles on opposite sides of lid 111 and wedge collar 112. In use, one opposing pair of handles is pinched together with the left hand, the other with the right hand. this divides the force required to lock or unlock the wedge collar. This division of force can become important in applications requiring relatively hard gasket materials for accomplishing a high integrity seal between the lid 111 and the upper lip 116(a). Even in these cases the pinching force exerted on the opposing pairs of handles 111(b) and 112(b) is reduced by (a) the movement created by the radially extended handles themselves, (b) the mechanical advantage associated with low angle wedges 130, and (c) the fifty percent division of the required force between two pairs of handles. Normally the closure force is only that required to crush the deformable seal 119 by a predetermined amount while overcoming friction between the pins 120, the wedge collar 112 and the bearing member(s) 124.

Because handles 112(a) and 112(b) are symmetrically located on opposite sides of the wedge collar 112 and because the internal wedges 130 are symmetrically disposed, each half of the wedge collar is identical and may be produced from the same mold. Obviously, there are many varied handle arrangements which can achieve the desired movement between the lid 111 and the wedge collar 112. In one variation handles 111(a) and 111(b) can be moved closer together or formed as a single integral handle connected to the lid 111. Alternatively, the handles can take the form of finger or thumb recesses in either the lid 111, the wedge collar 112, or both. In very large diameter or high pressure applications, the collar 112 may be rotated by mechanical means ranging from simple latch mechanisms to complex motor driven worm gears. Alternatively, relative rotation could be achieved through the use of a pair of spanner wrenches, one connected to the lid 111 and the other connected to the wedge collar 112.

The second embodiment of the invention has been described in conjunction with one form of widely used plastic container (a five-gallon bucket) but the same concepts may be incorporated into a closure for any circular aperture capable of being adapted to include or receive a plurality of pins. Furthermore, as illustrated in conjunction with the third embodiment of the invention, the same inventive concepts can be incorporated in connectors for use with tubes, pipes, hoses and rods.

The second preferred embodiment of the invention incorporates features which provide a container which can be repeatedly and consistently opened and positively resealed, allowing frequent access to contents which require special isolations. In some applications, however, it is sufficient that filled containers are firmly closed only during storage, transportation and up to the time the contents are initially used by the purchaser. In these applications, the availability of automated packaging equipment reduces the functional demands for ease of connection and the need for simple and repeatable reclosure is either reduced or eliminated. Thus, where the containers are filled and closures are installed at a production facility staffed by skilled personnel aided by proper equipment, the connection between the lid and the container can be simplified and can function solely as a detachable connector with less regard to ease of reconnection. For convenience, these are referred to as factory installed applications.

The same lid 111 and pin collar 116 described earlier can be used for factory installed applications. This may provide the greatest versatility with the lowest tooling cost. Alternatively, the pins 120 can be molded as a part of the container 101 and the lid 111 can be simplified by eliminating, for example, the retainer flange 114. The wedge collar 112 can be substantially simplified depending upon how the lid 111 is applied in factory installed applications. The handles 111(a), 111(b), 112(a), 112(b) can be eliminated entirely and the taper angle of the wedges can be either greatly increased or reduced to zero. In addition, the pins 120 and wedges 130 can be exposed by eliminating the outer wall of wedge collar 112.

In factory installed applications, the lid 111 will typically be oriented and forced in place by automated packing equipment. This equipment is capable of pushing the lid 111 firmly over the container 101 and preloading or predeforming either the seat 119(a) or any deformable gasket material (such as an O-Ring 119) located therein. This preloading of the lid 111 allows the placement of wedges 130 between the pins 120 and the bearing surfaces (124(a)) of bearing members 124 with primarily radial movement rather than circumferential movement. Such preloading of the lid 111 separates the pins 120 form the bearing member 124 by a desired distance and allows for very rapid and easy placement of the wedges 120. After the preload on the lid 111 is removed, the wedges 120 function separate and maintain the pins 120 and bearing member 124 at a predetermined distance. Typically this predetermined distance would be correspond to the desired amount of closure deformation. For example, where a solid O-Ring gasket 119 is constrained in seat 119(a), the predetermined distance will be between about 20 and 30 percent of the O-Ring's cross-sectional diameter. This predetermined distance will vary with each application, with the design of seat 119(a), with the kind of sealing deformation involved and with the quality of the seal or connection required.

FIGS. 26 through 29 illustrate a few of the many wedge variations suitable for use in factory installed applications. In each figure the lid 111 includes a seat 119(a) having a solid O-Ring 119. A flat gasket, a hollow O-Ring or a resiliently defined seat could also be used. The container 101 includes an upper lip 116(a) and a first reinforcing rib 116(b) which serve to vertically constrain pin collar 116 which includes a plurality of circumferentially spaced pins 120. The lid 111 includes a corresponding plurality of pin slots 125 through both the cylindrical walls and through bearing member(s) 124. Functionally the lid 111 corresponds to the lids 11 and 111 previously described with generally corresponding parts. Also shown in FIGS. 26-29 is an optional retainer flange 114. The structure of the seat 119(a) is stiffened by a plurality of circumferentially spaced webs 138 which join the outer sides of the seat 119(a) to the retainer flange 114 and the top surface of lid 111.

As illustrated in the sectional views of FIGS. 26-29, the various alternative wedge structures have been located between the pins 120 and the bearing surface 124(a) of bearing member 124 after the lid 111 and thus the O-Ring 119 have been preloaded by the a uniformly distributed downward force on the lid 111. The O-Ring 119 is shown in its desired deformed configuration after the wedges 160-163 have been moved into place and the preload force has been removed from lid 111. In this state the wedges function to separate and maintain the pins 120 and the bearing surface 124(a) at a predetermined distance while the pins 120 located in pin slots 125 maintain the lid 111 and the pin collar 116 in predetermined juxtaposition.

Figure 26:
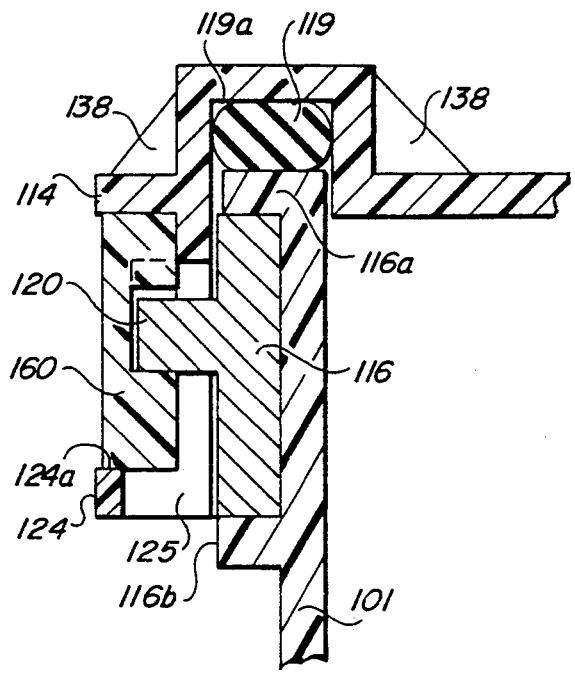

FIG. 26 illustrates a wedge collar 160 which is structurally equivalent to wedge collar 12 described in conjunction with FIGS. 3 and 9 except for the absence of slots 12(a). The wedge collar 160 may be a rigid molded structure inserted over lid 111 in the absence of optional flange 114. Alternatively the wedge collar 160 may be wrapped around the outer circumference of lid 111 while the lid 111 is preloaded and then held in place by any convenient mechanism such as end clip 150 illustrated in FIGS. 15 and 16.

The wedge collar 161 shown in FIG. 27 corresponds structurally to collar 112 illustrated in FIGS. 13, 19 and 20. It too may be applied as a single rigid structure or as a split collar or it may be wrapped around the periphery of lid 111. The wedge collar 162 shown in FIGS. 28 corresponds to wedge collar 160 in FIG. 26 except that the outer wall is deleted and the pins 120 are visible. A structural flange 162(a) is included at the bottom of collar 162 to add rigidity and to better distribute the closure forces over the bearing surface 124(a) of bearing member 124. The wedge collar 163 shown in FIG. 29 may be of the same configuration as wedge collar 162 but is further held in position by one or more barbs 120(a) or functionally similar structures on pins 120. In this example, the wedge collar 163 is wrapped around the cylindrical walls of lid 111 and forced over the tapered leading edges of barbs 120(a).

The wedge collars 160-163 are held in position by the resilient force exerted by O-Ring 119, by the friction between the wedge collars 160-163, the pins (120), and the bearing members 124. In addition, other mechanisms such as barbs 120(a) or end clips 150 or snaps 140/141 may be used to retain the wedge collars. In factory installed applications, preloading of the lid 111 also allows the wedge collar to be configured with untapered wedges extruded extended in the form of flexible strips having substantially uniform cross-sectional area. For example, wedge collar 163 in FIG. 29 could alternatively consist of a continuous strip wrapped around lid 111 between only the lower surface of pins 120 and the bearing surface 124(a). Wedge collar 163 could also consist of a series of L-shaped clips inserted between pins 120 and bearing surface 124(a). In either of these examples, the wedges 163 would be held in position after removal of the preload by friction and by lower barbs 120(a). Wedge collars 162 or 163 could alternatively consist of a series of L-shaped clips or a continuous wrap around strip having apertures to receive pins 120.

In the various factory installed applications discussed in conjunction with FIGS. 26-29 the wedges may be tapered or untapered, depending upon the packaging techniques used to apply the wedge collars 160-163. In cases where the wedge collars are wrapped around lid 111 or take the form of a series of individual clips, they can be easily detached simply by radially forcing them out of position between pins 120 and bearing surfaces 124(a). While not as convenient as other embodiments, these forms of connection can be reestablished by again preloading the O-Ring 119 while the wedge collar is again located between pins 120 and bearing member(s) 124. Generally, however, these factory installed applications will be used where a positive detachable connection is required only during storage and transportation preceding the consumer's initial use of the contained material.

J. DESCRIPTION OF THE THIRD EMBODIMENT

A third embodiment of the invention, illustrated in FIGS. 12 and 30-38, is a quick connect/disconnect for use on tubes, pipes, hoses and rods. The connector includes: a male part 216 having pins 220 and a sealing surface 216(a); a female part 211 having a seat 219(a) and pin slots 225 which pass through both the cylindrical walls of part 211 and through a portion of the bearing surface 224(a) of bearing member 224; a wedge collar 212 including internal access slots 231 and wedges 230; and, an optional retainer 214 for axially retaining the wedge collar 212 for substantially concentric rotation around part 211.

As best shown in FIGS. 38 and 12, an O-Ring gasket 219 is located in seat 219(a) and is deformed therein as the parts 211 and 216 are drawn together by the rotation of collar 212 and the advancement of wedges 230 between the bearing surface 224(a) and the pins 220. The extent to which O-Ring 219 can be deformed is limited by surface 212(a) on part 211 engaging a corresponding surface 212(b) on part 216 (See FIGS. 36 and 37). As shown in FIGS. 37 and 38, the bearing surface 216(a) is in initial contact with the undeformed O-Ring 219. The distance between surfaces 212(a) and 212(b) corresponds to the maximum crush of O-Ring 219 when the parts 211 and 216 are fully engaged as shown in FIG. 12. Typically this distance will be approximately 20-30 percent of the cross-sectional diameter of O-Ring 219. The distance between surfaces 212(a) and 212(b) also represents the minimum rise of wedges 230 as they are advanced under pins 220. When fully engaged, surfaces 212(a) and 212(b) present hairline internal joint and the connector is characterized by a completely unobstructed, full flow inside diameter.

The connector depicted in FIGS. 12 and 30–38 represent a 1.5 inch inside diameter aluminum (6061) prototype having four quarter-inch wide pins 220, a wedge angle of approximately 1.5 degrees, and an O-Ring having a nominal cross-sectional diameter of 0.110 inches. This prototype was successfully tested to over 2000 psi positive internal pressure and over one atmosphere of negative pressure.

As shown in FIG. 36, the disclosed connector includes internal straight threads 250 and threads 251 in parts 211 and 216 respectively. Also included are corresponding O-Ring seats 252 and 253. These straight threads and O-Rings allow parts 211 and 216 to be fitted to threaded pipes, tubes, or rods, or to hose connectors, in fluid systems subjected to both pressure and vacuum. In pressure systems these connections 250, 251 can be tapered pipe threads. In vacuum systems these connections 250, 251 can be flange fittings. Similarly, flexible hoses can be connected at 250, 251 by expandable internal sleeves or by external compression rings.

The connector components 211, 212, 214 and 216 can be machined or molded and can be produced from metal or plastic. When the connector parts 211 and 216 are to be threaded to other cylindrical elements, it is desirable to provide some means, such as spanner wrench holes 255 in one of the two parts to hold them against rotation when the connector is installed. Because torque transfers across the engaged connector from part 216 to part 211, only one holding point is normally required.

As shown in FIG. 12, the optional retainer 214 may be secured in place over part 211 by a radial set screw, by means of a heat shrink fit, or by spot welding. Where the connector components are made of plastic, retainer 214 may be held in place by a snap, adhesive or solvent bond. As will be obvious to those of ordinary skill, the components of the connector described can be manufactured as integral parts of other cylindrical components or can be manufactured as a kit for use in retrofitting other cylindrical components. Likewise, the invention can be adapted for use in larger and smaller diameter applications, in linear applications, and in applications having a wide range of pressure and/or vacuum demands.

What is claimed is:

1. A method for detachably connecting a first tubular structure having a plurality of pins radially extending from its outer surface to a second tubular structure having at least one radially extending bearing member and a plurality of slots for receiving said pins, said method including the steps of:
   (a) moving said first and second tubular structures into substantially coaxial alignment with said pins engaged in said slots; and
   (b) moving a plurality of wedges between at least two of said pins and said bearing member to hold said pins and said bearing member apart and thereby maintain said first and second tubular structures in connected engagement.

2. The method of claim 1 including the subsequent step of:
   (c) moving said wedges from between said pins and bearing member; and,
   (d) disengaging said first and second tubular structures from one another.

3. The method of claim 2 including the intermediate steps of detachably locking said wedges against movement with respect to said pins after the tubular structures are substantially connected; and, unlocking said wedges for movement with respect to said pins prior to steps (d) and (d).

4. The method of claim 1 including the additional step of deforming a gasket material between said first and second tubular structures to a predetermined extent.

5. The method of claim 4 wherein said deforming step commences prior to completion of said step (b).

6. The method of claim 5 wherein said deforming step and said step (b) occur substantially concurrently.

7. The method of claim 6 wherein said wedges are moved rotationally.

8. The method of claim 5 wherein the performance of said deforming step and the performance of said step (b) overlap in time.

9. The method of claim 1 including the additional step of connecting each of said tubular structures to other tubular structures.

10. The method of claim 9 including the additional step of deforming a gasket material between said first and second tubular members.

11. The method of claim 10 wherein said wedges are moved rotationally.

12. Apparatus for detachably connecting a first structure to a second structure, comprising in combination:
   (a) at least two pins extending from a surface of said first structure;
   (b) at least one bearing member extending from a surface of said second structure;
   (c) alignment structure orienting said pins and bearing member in predetermined juxtaposition;
   (d) a plurality of wedges movable between said pins and bearing member, and adapted to force said pins and bearing member apart when said wedges are moved therebetween;

whereby said first and second structures are (i) connected by aligning said pins and bearing member in said predetermined juxtaposition and moving said wedges between said pins and bearing member to force them apart, thereby drawing said first and second structures into connected engagement; and, (ii) disconnected by removing said wedges from between said pins and bearing member, thereby allowing the first and second structures to be separated.

13. The apparatus of claim 12 wherein said bearing member includes a substantially continuous load bearing surface connected to and extending from the surface of said second structure.

14. The apparatus of claim 12 wherein said bearing member comprises a plurality of substantially coplanar load bearing surfaces connected to and extending from the surface of said second structure.

15. The apparatus of claim 12 wherein
   said first and second structures are cylindrical;
   said pins extend radially from the surface of said first structure;
   said bearing member comprises at least one circumferential flange member extending radially from the surface of said second structure;
   said alignment structure coaxially orients said first and second structures and substantially limits rotational movement therebetween as said structures are detachably connected; and
   said wedges are connected as part of a tubular collar which is rotatably movable with respect to said first and second structures.

16. The apparatus of claim 15 wherein said wedges are tapered over a portion of their length at an angle which is less than about ten degrees;

the coefficient of friction between said wedges and said pins and bearing surface is less than about 0.6; and the force required to move said wedges is less than about half of the corresponding force exerted by said wedges between said pins and bearing surface as said first and second structures are detachably connected.

17. The apparatus of claim 16 further including
at least one handle connected to one of said cylindrical structures; and
at least one handle connected to said collar,
whereby said wedges are rotated relative to said pins as said handles are moved relative to one another.

18. The apparatus of claim 16 further including
first and second handles connected to one of said cylindrical structures;
a third handle connected to said collar and circumferentially movable between said first and second handles
whereby the first and second cylindrical structures are
(i) connected as the first and third handles are moved together; and
(ii) disconnected as the second and third handles are moved together.

19. The apparatus of claim 18 further including:
at least one first handle connected to one of said structures; and,
at least one second handle connected to said wedges
whereby said wedges are moved between said pins and bearing member by changing the distance between said first and second handles.

20. The apparatus of claim 15 wherein said circumferential flange member is substantially continuous around the perimeter of said second cylindrical structure and includes slots to allow passage of said pins as said cylindrical structures are aligned in said predetermined juxtaposition.

21. The apparatus of claim 15 wherein said pins are flattened on at least one side to slidably engage said wedges.

22. The apparatus of claim 21 wherein one of said cylindrical structures is hollow and the other cylindrical structure forms a closure over an end of said one cylindrical structure.

23. The apparatus of claim 22 further including a deformable gasket material for location between said cylindrical structures as said structures are drawn together into connected engagement.

24. The apparatus of claim 23 wherein at least a portion of said closure is substantially transparent to light of a predetermined frequency range.

25. The apparatus of claim 23 wherein said closure includes a sealed feedthrough for conducting electrical energy through said closure.

26. The apparatus of claim 23 wherein said closure includes a sealed feedthrough for conveying fluids through said closure.

27. The apparatus of claim 23 wherein said closure includes a sealed feedthrough for transmitting mechanical motion through said closure.

28. The apparatus of claim 23 wherein
said wedges, pins and bearing member are made of plastic;
said angle is less than about three degrees; and,
said coefficient of friction is less than about 0.35.

29. The apparatus of claim 28 wherein said wedges and said second cylindrical structure are made from different kinds of plastic and said second cylindrical structure is at least partially transparent to visible light.

30. The apparatus of claim 22 comprising a kit of parts including said first and second cylindrical structures wherein said one cylindrical structure is adapted for connection over an opening in an existing structure, thereby providing a detachable closure for said opening.

31. The apparatus of claim 30 wherein the connection between said one cylindrical structure and said opening is accomplished by a mechanism selected from the group consisting of: (i) a circumferential threaded engagement, (ii) a circumferential compression band, (iii) a circumferential split collar, (iv) a plurality of circumferentially disposed threaded fasteners, (v) a plurality of circumferentially disposed clamps, (vi) a hose clamp, (vii) an internal expansion sleeve, (viii) an adhesive connection, (ix) a welded connection, (x) a snap connection, and (xi) a bolted flange.

32. The apparatus of claim 31 further including a deformable gasket material for location between said cylindrical structures as said structures are drawn together into connected engagement.

33. The apparatus of claim 32 further including a second gasket for location between said one cylindrical structure and said existing structure.

34. The apparatus of claim 31 wherein said closure further includes a feedthrough mechanism selected from the group consisting of: (i) a window for transmitting light through said closure, (ii) a conductor for transmitting electrical energy through said closure, (iii) a port for conveying fluids through said closure, and (iv) a linkage for transmitting mechanical movement through said closure.

35. The apparatus of claim 34 further including a second gasket for location between said one cylindrical structure and said existing structure.

36. The apparatus of claim 15 wherein said first and second cylindrical structures are tubular structures.

37. The apparatus of claim 36 comprising a kit of parts including said first and second cylindrical structures wherein each of said cylindrical structures is adapted for separate connection to the end of another tubular structure, thereby providing a detachable connection between the other tubular structures.

38. The apparatus of claim 37 wherein the connection between at least one of said cylindrical structures and one of said other tubular structures comprises a mechanism selected from the group consisting of: (i) a circumferential threaded engagement, (ii) a circumferential compression band, (iii) a circumferential split collar, (iv) a plurality of circumferentially disposed threaded fasteners, (v) a plurality of circumferentially disposed clamps, (vi) a hose clamp, (vii) an internal expansion sleeve, (viii) an adhesive connection, (ix) a welded connection, (x) a snap connection, and (xi) a bolted flange.

39. The apparatus of claim 38 further including a deformable gasket material for location between said first and second cylindrical structures as said structures are drawn together in connected engagement.

40. The apparatus of claim 28 further including at least one additional gasket to provide an improved seal at a connection between one of said cylindrical structures and one of said other tubular structures.

41. The apparatus of claim 38 wherein said wedges are tapered over a portion of their length at an angle which is less than about ten degrees;

the coefficient of friction between said wedges and said pins and bearing surface is less than about 0.6; and, the force required to move said wedges is less than about half of the corresponding force exerted by said wedges between said pins and bearing surface as said first and second structures are detachably connected.

42. The apparatus of claim 15 wherein said tubular collar includes at least two separable segments.

43. The apparatus of claim 42 wherein each of said segments further include mating connectors for joining said segments end to end to form said collar.

44. The apparatus of claim 43 wherein said mating connectors are selected from the group consisting of: (i) deformable tongue and groove snap joints, (ii) welded joints, (iii) adhesive joints, (iv) lapped pin joints, (v) bolted flange joints, and (vi) pivotally linked joints.

45. The apparatus of claim 15 wherein said collar is formed from a continuous band of flexible material.

46. The apparatus of claim 15 wherein said cylindrical structures are substantially tubular and are adapted to convey the flow of fluid materials.

47. The apparatus of claim 46 wherein each of said cylindrical structures is adapted for separate connection to other tubular structures, thereby providing an intermediate detachable connection between said other tubular structures.

48. The apparatus of claim 47 further including
a resilient structure which is deformed when said pins and bearing surface are at said predetermined distance from one another.

49. The apparatus of claim 47 wherein said circumferential flange member is substantially continuous around the perimeter of said second cylindrical structure and includes slots to allow passage of said pins as said cylindrical structures are aligned in said predetermined juxtaposition.

50. The apparatus of claim 49 wherein said pins are flattened on at least one side to slidably engage said wedges.

51. The apparatus of claim 50 further including a deformable gasket material for location between said cylindrical structures as said structures are drawn together into connected engagement.

52. Apparatus for detachably connecting a first cylindrical structure to a second cylindrical structure comprising in combination:

(a) a plurality of pins extending radially from a surface of said first cylindrical structure;

(b) at least one bearing surface extending radially from a surface of said second cylindrical structure;

(c) an alignment structure for orienting said pins and bearing surface in predetermined juxtaposition;

(d) a plurality of wedges detachably locatable between said pins and bearing surface, said wedges separating and substantially maintaining said pins and bearing surface at a predetermined distance from one another;

whereby the first and second cylindrical structures are detachably connected to one another by aligning said pins and bearing surface in said predetermined juxtaposition and locating the wedges therebetween to maintain said pins and bearing surface apart at said predetermined distance.

53. The apparatus of claim 52 wherein said wedges are untapered.

54. The apparatus of claim 53 further including a resilient structure for urging said first and second cylindrical structures apart when they are connected to one another.

55. The apparatus of claim 54 wherein said resilient structure comprises a deformable gasket material located between said first and second cylindrical structures to provide an improved seal therebetween, said gasket material being in resilient compression when said pins and bearing surface are separated by said predetermined distance.

56. The apparatus of claim 55 wherein said gasket material comprises an O-Ring.

57. The apparatus of claim 53 wherein said wedges comprise a circumferential band of material of substantially uniform cross-section.

58. The apparatus of claim 57 wherein said circumferential band further includes a plurality of spaced apertures for detachably receiving said pins.

59. The apparatus of claim 58 wherein said pins include additional structure for detachably retaining said circumferential band in position between said pins and said bearing surface.

60. The apparatus of claim 53 wherein said wedges comprise a circumferential band having spaced apertures for detachably receiving and retaining at least two of said plurality of pins.

61. The apparatus of claim 52 wherein said pins are connected to a collar and said collar is constrained below a lip defining the outermost portion of a circular aperture in a container.

62. The apparatus of claim 61 wherein said second cylindrical structure comprises a cover for said container.

63. The apparatus of claim 62 further including a resilient structure for urging said first and second cylindrical structures apart when they are connected to one another.

64. The apparatus of claim 63 wherein said resilient structure comprises a deformable gasket material located between said first and second cylindrical structures to provide an improved seal therebetween, said gasket material being in resilient compression when said pins and bearing surface are separated by said predetermined distance.

65. The apparatus of claim 64 wherein said gasket material comprises an O-Ring.

66. The apparatus of claim 52 further including
a collar structure connecting said wedges together for circumferential movement between said pins and bearing surface;

at least one first handle connected to one of said cylindrical structures; and at least one second handle connected to said collar structure;

whereby said wedges are moved between said pins and bearing member by changing the distance between said first and second handles.

67. Apparatus for detachably connecting a first tubular structure to a second tubular structure, comprising in combination:

(a) a plurality of pins uniformly spaced around, connected to, and extending radially from the outer surface of said first tubular structure;

(b) a bearing flange connected to and extending from the outer surface of said second tubular member and defining a substantially continuous bearing surface;

(c) a plurality of circumferentially spaced slots in said second tubular structure and through at least portions of said bearing flange for slidably receiving said pins and for substantially limiting rotational displacement between said first and second tubular structures;

(d) a plurality of wedges connected to a collar and rotatably movable between said pins and said bearing flange, said wedges (i) being tapered, (ii) including an angle of taper less than about ten degrees over at least a portion of their respective lengths, (iii) having a coefficient of function with respect to said pins and bearing surface of less than 0.5, and (iv) being adapted to force said pins and said bearing member apart when said wedges are moved therebetween; and (e) a deformable gasket between said first and second cylindrical structures for providing an improved seal therebetween;

whereby said first and second tubular structures are detachably joined by slidably engaging said pins in said slots and rotatably moving said wedges to force said pins and said bearing flange apart, thereby drawing the tubular structures together and deforming said gasket therebetween.

68. The apparatus of claim 67 further including a stop for limiting the deformation of said gasket to a predetermined amount.

69. The apparatus of claim 68 further including a safety latch for substantially preventing rotation of said collar when said first and second tubular structures are connected.

70. The apparatus of claim 68 wherein at least one of said first and second tubular structures is adapted for connection to other tubular structure, thereby providing a detachable connection to said other tubular structure.

71. The apparatus of claim 68 wherein
one of said tubular structures is concentric with an opening in fluid communication with the inside of a container; and,
the other tubular structure is enclosed at one end and functions as a closure for said opening when said first and second tubular structures are connected.

72. The apparatus of claim 71 further including at least one reverse wedge for urging said pins toward said bearing flange when the plurality of wedges are rotatably moved from between said pins and bearing flange.

* * * * *